(12) United States Patent
Warner

(10) Patent No.: US 8,885,977 B2
(45) Date of Patent: Nov. 11, 2014

(54) AUTOMATICALLY EXTENDING A BOUNDARY FOR AN IMAGE TO FULLY DIVIDE THE IMAGE

(75) Inventor: Peter Warner, Paris (FR)

(73) Assignee: Apple Inc., Cupertino, CA (US)

( * ) Notice: Subject to any disclaimer, the term of this patent is extended or adjusted under 35 U.S.C. 154(b) by 1437 days.

(21) Appl. No.: 12/433,872

(22) Filed: Apr. 30, 2009

(65) Prior Publication Data

US 2010/0278424 A1 Nov. 4, 2010

(51) Int. Cl.
*G06K 9/20* (2006.01)
*G06T 7/00* (2006.01)
*G06F 3/0484* (2013.01)

(52) U.S. Cl.
CPC ... *G06F 3/04842* (2013.01); *G06T 2207/10016* (2013.01); *G06T 2207/30201* (2013.01); *G06T 7/0083* (2013.01); *G06T 2207/20104* (2013.01)
USPC ........... 382/282; 382/164; 382/165; 382/173; 345/624

(58) Field of Classification Search
USPC ........... 345/620–628; 358/453; 382/162–168, 382/173, 276, 282–294
See application file for complete search history.

(56) References Cited

U.S. PATENT DOCUMENTS

| | | | |
|---|---|---|---|
| 3,465,322 A * | 9/1969 | Stapper, Jr. | 360/114.05 |
| 5,805,725 A | 9/1998 | Sakata et al. | |
| 5,805,858 A | 9/1998 | Kumamoto et al. | |
| 6,141,034 A * | 10/2000 | McCutchen | 348/36 |
| 6,535,213 B1 | 3/2003 | Ogino et al. | |
| 6,587,596 B1 * | 7/2003 | Haeberli | 382/283 |
| 6,628,285 B1 | 9/2003 | Abeyta et al. | |
| 6,683,989 B1 * | 1/2004 | Fujiwara et al. | 382/239 |
| 6,741,755 B1 | 5/2004 | Blake et al. | |
| 7,034,849 B1 * | 4/2006 | Weybrew et al. | 345/629 |
| 7,092,122 B2 | 8/2006 | Iwaki | |

(Continued)

FOREIGN PATENT DOCUMENTS

| | | |
|---|---|---|
| EP | 2 286 384 | 2/2011 |
| EP | 2431942 | 3/2012 |

(Continued)

OTHER PUBLICATIONS

Preliminary Amendment of U.S. Appl. No. 12/154,989, Aug. 15, 2008, Pettigrew, Daniel, et al.

(Continued)

*Primary Examiner* — Chan Park
*Assistant Examiner* — Mia M Thomas
(74) *Attorney, Agent, or Firm* — Adeli LLP

(57) ABSTRACT

Some embodiments provide a method for editing an image. For a displayed image, the method draws a partial boundary based on movement of a cursor over the image. The partial boundary does not fully divide the image into a region of interest and a second region. Upon completion of the cursor movement, the method automatically extends at least one end of the boundary in order to divide the image into the region of interest and the second region. The method applies edits (e.g., color correction) to only the region of interest of the image. In some embodiments, automatically extending at least one end of the boundary involves (i) extending one or both of the ends to points at which the boundary ends intersect borders of the image and (ii) connecting the boundary from the intersection points along the borders of the image.

20 Claims, 21 Drawing Sheets

(56) References Cited

U.S. PATENT DOCUMENTS

| | | | |
|---|---|---|---|
| 7,256,911 | B2 | 8/2007 | Takabayashi et al. |
| 7,292,370 | B2 | 11/2007 | Iwaki |
| 7,430,339 | B2 | 9/2008 | Rother et al. |
| 7,565,000 | B2 * | 7/2009 | Capolunghi et al. .......... 382/128 |
| 7,602,991 | B2 | 10/2009 | Kokemohr |
| 7,639,387 | B2 * | 12/2009 | Hull et al. .................... 358/1.18 |
| 7,693,341 | B2 | 4/2010 | Pettigrew et al. |
| 7,702,149 | B2 | 4/2010 | Ohkubo et al. |
| 7,755,644 | B1 * | 7/2010 | Stephens ...................... 345/624 |
| 7,876,939 | B2 * | 1/2011 | Yankelevitz et al. ......... 382/128 |
| 7,940,995 | B2 | 5/2011 | Lee et al. |
| 8,116,582 | B2 * | 2/2012 | Erol ............................. 382/254 |
| 8,351,084 | B2 * | 1/2013 | Bernal et al. ................. 358/3.05 |
| 2002/0194195 | A1* | 12/2002 | Fenton et al. ............. 707/104.1 |
| 2003/0081837 | A1* | 5/2003 | Williame et al. ............ 382/215 |
| 2004/0021696 | A1* | 2/2004 | Molgaard ..................... 345/810 |
| 2004/0227768 | A1 | 11/2004 | Bates et al. |
| 2005/0041866 | A1* | 2/2005 | Silverman et al. ........... 382/188 |
| 2005/0134945 | A1* | 6/2005 | Gallagher .................... 358/527 |
| 2005/0198590 | A1* | 9/2005 | Jarrett et al. .................. 715/863 |
| 2005/0238217 | A1 | 10/2005 | Enomoto et al. |
| 2006/0005135 | A1* | 1/2006 | Vetelainen ................... 715/723 |
| 2006/0029275 | A1 | 2/2006 | Li et al. |
| 2006/0039611 | A1 | 2/2006 | Rother et al. |
| 2006/0126719 | A1 | 6/2006 | Wilensky |
| 2006/0210172 | A1* | 9/2006 | Sutanto et al. ................ 382/229 |
| 2006/0215924 | A1* | 9/2006 | Steinberg et al. ............ 382/254 |
| 2007/0100226 | A1* | 5/2007 | Yankelevitz et al. ......... 600/407 |
| 2007/0247475 | A1 | 10/2007 | Pettigrew et al. |
| 2007/0247679 | A1* | 10/2007 | Pettigrew et al. ............ 358/518 |
| 2007/0292032 | A1* | 12/2007 | Silverman et al. ........... 382/187 |
| 2008/0069440 | A1 | 3/2008 | Forutanpour |
| 2008/0117333 | A1 | 5/2008 | Walsh |
| 2008/0131010 | A1 | 6/2008 | Wilensky |
| 2008/0170783 | A1 | 7/2008 | Yoo et al. |
| 2009/0028382 | A1* | 1/2009 | Erol ............................. 382/100 |
| 2009/0220149 | A1 | 9/2009 | Menadeva et al. |
| 2009/0297031 | A1 | 12/2009 | Pettigrew et al. |
| 2009/0297034 | A1* | 12/2009 | Pettigrew et al. ............ 382/199 |
| 2009/0297035 | A1 | 12/2009 | Pettigrew et al. |
| 2009/0300553 | A1 | 12/2009 | Pettigrew et al. |
| 2010/0049315 | A1* | 2/2010 | Kirson ......................... 623/2.37 |
| 2010/0177234 | A1 | 7/2010 | Ogura et al. |
| 2010/0188415 | A1* | 7/2010 | Pettigrew et al. ............ 345/589 |
| 2010/0278504 | A1* | 11/2010 | Lyons et al. ................... 386/52 |
| 2011/0085218 | A1* | 4/2011 | Bernal et al. ................. 358/518 |
| 2011/0242283 | A1* | 10/2011 | Tyagi et al. ..................... 348/46 |
| 2011/0316851 | A1* | 12/2011 | Pettigrew et al. ............ 345/419 |

FOREIGN PATENT DOCUMENTS

| | | |
|---|---|---|
| EP | 2458552 | 5/2012 |
| EP | 2458560 | 5/2012 |
| WO | WO 01/26050 | 4/2001 |
| WO | PCT/US2009/045094 | 5/2009 |
| WO | WO 2009/154951 | 12/2009 |

OTHER PUBLICATIONS

PCT Invitation to Pay Additional Fees with Partial Search Results for PCT/US2009/045094, Nov. 25, 2009 (mailing date), Apple Inc.

Mortensen, Eric N., et al., "Interactive Segmentation with Intelligent Scissors," Graphical Models and Image Processing, Sep., 1998, pp. 349-384, vol. 60, No. 5, Academic Press, Duluth, MA, US.

Author N/A, "Adobe Photoshop 5.0 User Guide, Chapter 7—Selecting", Adobe Photoshop 5.0 User Guide, Month N/A, 1998, pp. 137-164, Adobe Systems Incorporated.

Liang, J., et al., "United Snakes", Computer Vision, 1999, The Proceedings of the Seventh IEEE International Conference on Kerkyra, Greece, Sep. 20-27, 1999, pp. 933-940, vol. 2, Sep. 1999, IEEE Computer Society.

Yin, Li, et al., "Lazy Snapping", ACM Transactions on Graphics, Jan., 2004, pp. 303-308, vol. 23, No. 3, ACM, New York, NY, US.

U.S. Appl. No. 13/134,313, filed Aug. 3, 2011, Bryant, Andrew, et al.

Author Unknown, "Using Adobe Flash CS4 Professional," Month Unknown, 2008, 474 pages, Adobe Systems Incorporated, San Jose, California, USA.

Mortensen, Eric N., et al., "Intelligent Scissors for Image Composition," Computer Graphics Proceedings (SIGGRAPH), Aug. 6-11, 1995, pp. 191-198, IEEE, New York, USA.

Wang, Jue, et al., "Soft Scissors: An Interactive Tool for Realtime High Quality Matting," ACM Transactions on Graphics, Jul., 2007, pp. 9-1-9-6, vol. 26, No. 3, ACM, New York, NY, USA.

Orzan, Alexandrina, et al. "Diffusion Curves: A Vector Representation for Smooth-Shaded Images," ACM Transactions on Graphics (Proceedings of SIGGRAPH 2008), Aug. 2008, vol. 27, Issue 3.

Orzan, Alexandrina, et al. "Diffusion Curves: A Vector Representation for Smooth-Shaded Images," Screenshots of Online Video, http://artis.imag.fr/Publications/2008/OBWBTS08/, NPL Date Unknown.

Biafore, Bonnie, "Visio 2003 Bible", ISBN: 0-7645-5724-6, 2004 Month N/A, pp. IX to XXXV, p. 30, p. 612 Table 32-1, Wiley Publishing, Inc., Indianapolis, Indiana.

Bai, Xue, et al., "A Geodesic Framework for Fast Interactive Image and Video Segmentation and Matting," Dec. 26, 2007, 8 pages, IEEE Xplore.

McInerney, Tim, "SketchSnakes: Sketch-line initialized Snakes for efficient interactive medical image segmentation," Apr. 9, 2008, pp. 331-352, ScienceDirect.

Portions of prosecution history for EP12156769, Apr. 26, 2012 (mailing date), Apple Inc.

Portions of prosecution history for EP12156770, Apr. 26, 2012 (mailing date), Apple Inc.

Kang, Hyung Woo, et al., "Enhanced Lane: Interactive Image Segmentation by Incremental Path Map Construction," Graphical Models, Month Unknown, 2003, pp. 282-303, vol. 64, Elsevier, San Diego, CA USA.

Rother, Carsten, et al., "GrabCut—Interactive Foreground Extraction Using Iterated Graph Cuts," Proceedings of the ACM SIGGRAPH, Month Unknown, 2004, pp. 309-314, ACM, New York, USA.

* cited by examiner

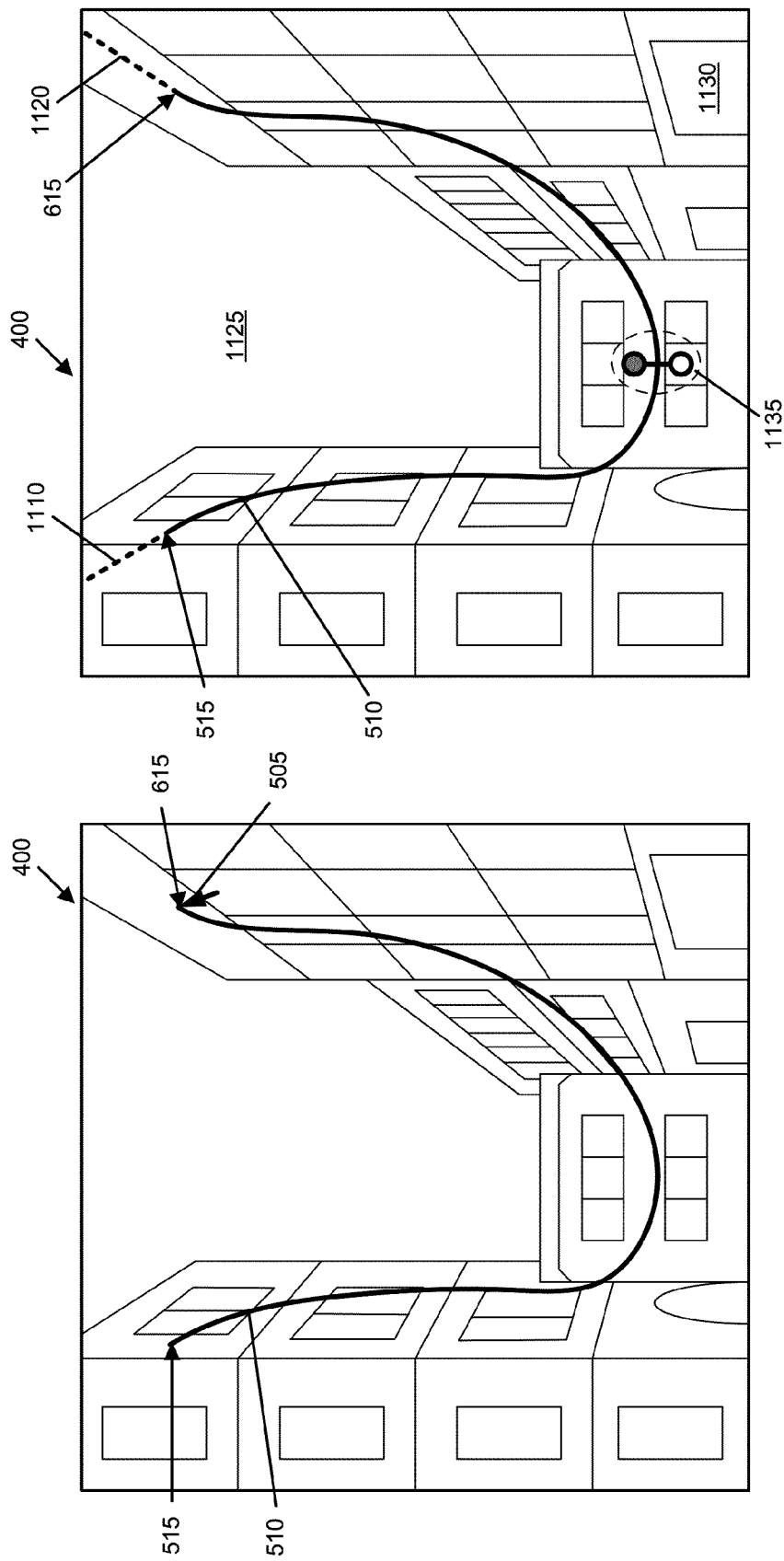

AUTOMATICALLY EXTENDING A BOUNDARY FOR AN IMAGE TO FULLY DIVIDE THE IMAGE

FIELD OF THE INVENTION

The invention is directed towards media-editing applications. Specifically, the invention is directed towards drawing a boundary for an image in order to define a region of interest for editing the image.

BACKGROUND OF THE INVENTION

Media-editing applications provide users with the ability to modify digital images and video from their original state. Often a user will want to modify properties of an image or of a selection of an image (e.g., color properties, etc.). In order to modify a selection of an image, a user must have a way to select the portion of the image they want to modify. Some prior art selection tools allow a user to draw a boundary around the selection. However, such tools mandate that the user draw a closed boundary. This can require a precision that may be difficult to achieve, thereby making the selection process rather cumbersome.

Further, in order to select an area that abuts a border of the image, a user must draw the boundary outside of the image, as illustrated in FIG. 1. In order to draw such a boundary, the user may need to pan the image down so that the boundary can be drawn within an editing window that displays the image. This can be a time-consuming and processor-intensive process. As such, there is a need for an easier method for drawing a boundary around a desired region of an image in a media-editing application.

SUMMARY OF THE INVENTION

Some embodiments of the invention provide a novel method for defining a region of interest for an image. The method of some embodiments draws a boundary for the image based on movement of a cursor over the image. When the boundary does not fully define a region of interest, the method automatically extends the boundary in order to divide the image into a first region (the region of interest) and a second region.

The method of some embodiments is performed by a media-editing application (e.g., an image-editing application, a video-editing application, etc.). Accordingly, the image is a stand-alone image (e.g., a photograph) in some cases, or is a video picture (i.e., a frame or field of video) in other cases. The media-editing application of some embodiments is a stand-alone application, while in other embodiments the media-editing application is incorporated into another application (e.g., an operating system of a computer or other device). Furthermore, while the description below refers to an editing application, some embodiments that extend a boundary for an image are performed by other types of applications.

Some embodiments of the editing application provide a user interface tool that when selected allows a user to draw a boundary for an image by moving a cursor over the image. When the boundary divides the image into two mutually exclusive regions, the editing application defines one of these regions as a region of interest.

When the boundary as drawn does not fully divide the image, the editing application of some embodiments automatically extends at least one end of the boundary such that the image is fully divided into two mutually exclusive regions. One way to divide the image with the boundary is to extend the initially drawn boundary to the border of the image. In these cases, one of the two mutually exclusive regions is defined as the region of interest. The region of interest in some such cases is the region that is inside the curve of the boundary. Another way to divide the image with the boundary is to extend the initially drawn boundary to a point at which the ends intersect and form a closed loop. In some embodiments, the region inside the loop is defined as the region of interest. Some embodiments allow input from a user to switch the region of interest and the region not of interest.

Once the boundary defines two mutually exclusive regions, some embodiments allow users to modify the boundary, and thus modify the region of interest (e.g., by selecting and dragging points on the boundary). In some embodiments, the region of interest defined by the boundary is used for editing the image. For instance, some embodiments receive edits (e.g., color correction, adding textures, etc.) to the image through the user interface of the editing application and apply the edits to the region of interest and not to the remainder of the image.

BRIEF DESCRIPTION OF THE DRAWINGS

The novel features of the invention are set forth in the appended claims. However, for purpose of explanation, several embodiments of the invention are set forth in the following figures.

FIGS. 5-6 illustrate a boundary drawn for the image of FIG. 4.

FIG. 11 illustrates the automatic extension of the boundary of FIG. 6 according to some embodiments.

DETAILED DESCRIPTION OF THE INVENTION

In the following description, numerous details are set forth for purpose of explanation. However, one of ordinary skill in the art will realize that the invention may be practiced without the use of these specific details.

Some embodiments of the invention provide a novel method for defining a region of interest for an image. The method of some embodiments draws a boundary for the image based on movement of a cursor over the image. When the boundary does not fully define a region of interest, the method automatically extends the boundary in order to divide the image into a first region (the region of interest) and a second region.

The method of some embodiments is performed by a media-editing application (e.g., an image-editing application, a video-editing application, etc.). Accordingly, the image is a stand-alone image (e.g., a photograph) in some cases, or is a video picture (i.e., a frame or field of video) in other cases. The media-editing application of some embodiments is a stand-alone application, while in other embodiments the media-editing application is incorporated into another application (e.g., an operating system of a computer or other device). Furthermore, while the description below refers to an editing application, some embodiments that extend a boundary for an image are performed by other types of applications.

Figure 1:
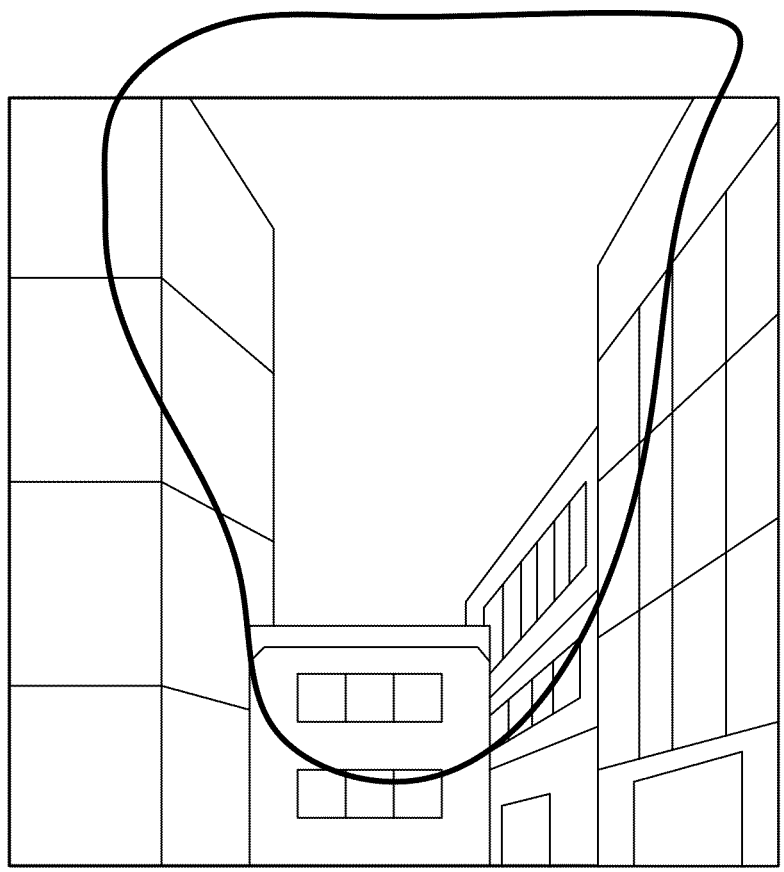
FIG. 1 illustrates a prior art selection tool.
Figure 2:
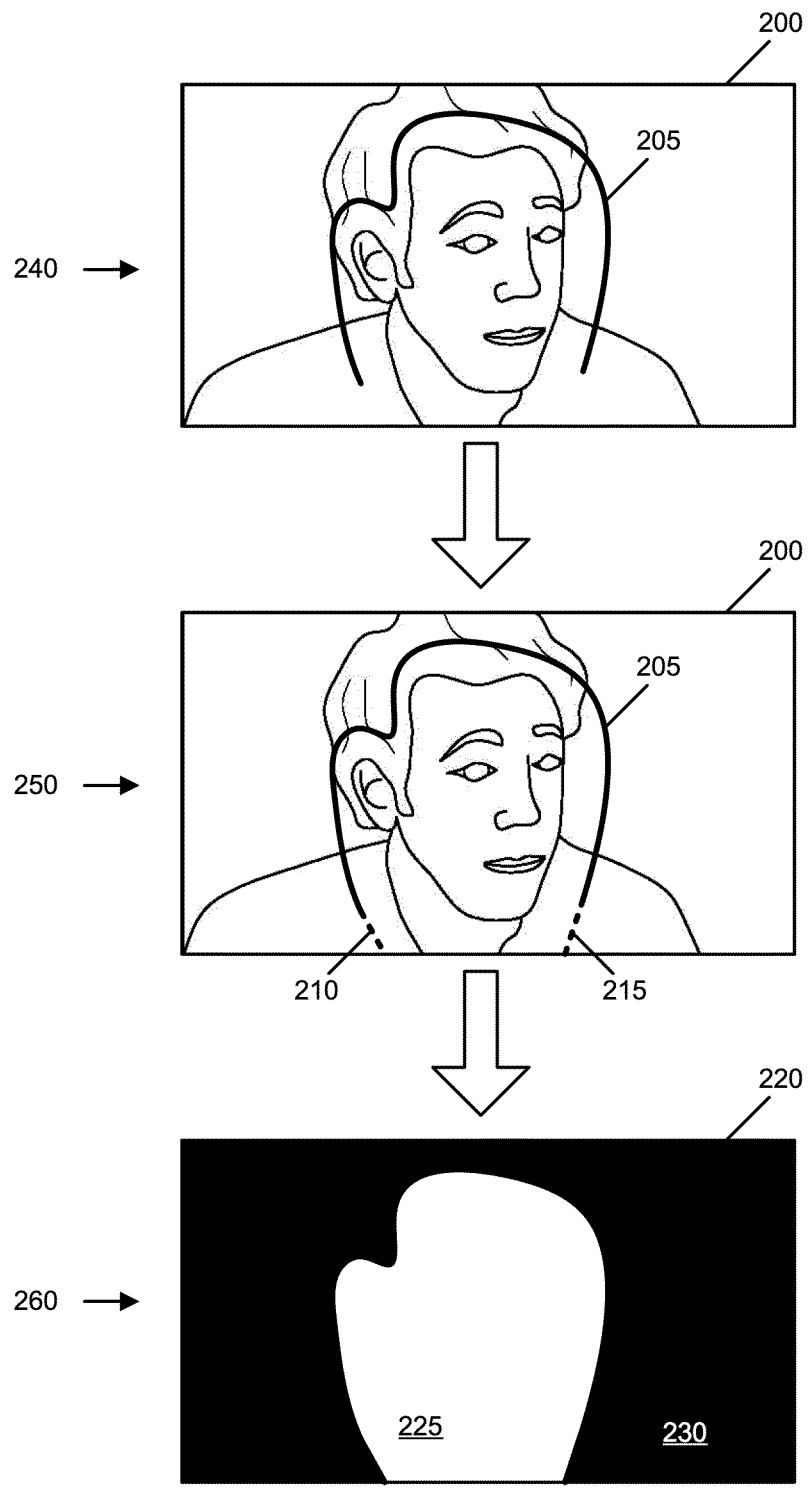
FIG. 2 illustrates an example of some embodiments of the invention that automatically extend a boundary if necessary to divide an image into two separate regions.

FIG. 2 illustrates an example of some embodiments of the invention that automatically extend a boundary if necessary to divide an image into two separate regions. FIG. 2 illustrates this process in three stages: (1) a first stage 240 that displays the result of drawing an initial boundary based on input from a cursor-controller, (2) a second stage 250 that displays the result of automatically extending the boundary, and (3) a third stage 260 that displays the result of identifying two separate regions based on the boundary.

The first stage 240 illustrates a boundary 205 drawn for an image 200. Some embodiments receive input (e.g., input moving a cursor over the image) through a user-interface of an editing application (or other application) to draw the boundary for the image. Based on the input, the editing application draws a boundary over the image. When the boundary divides the image into two mutually exclusive regions, one of these regions is defined as a region of interest. However, in the example illustrated in the first stage 240, the boundary 205 mostly encloses the face of the man in image 200 but does not fully divide image 200 into two regions.

When the boundary as drawn does not fully divide the image, the editing application of some embodiments automatically extends at least one end of the boundary such that the image is fully divided into two mutually exclusive regions. To do this, some embodiments extend the boundary to the borders of the image. In FIG. 2, the second stage 250 illustrates an example of such an extension. Specifically, the figure illustrates the extensions 210 and 215 of boundary 205 to the border of image 200. To generate such extensions, some embodiments draw the boundary extensions as straight lines tangent to the end of the initially drawn boundary, as illustrated in the example of the second stage 250 presented in FIG. 2. In some cases, some embodiments extend the boundary ends to a point at which they intersect and form a closed loop. Examples of such cases are provided below.

Once the boundary is extended so as to fully divide the image into two separate regions, some embodiments identify one of the two regions of the image as a region of interest. Different embodiments use different techniques to identify which of the two regions is the region of interest. For instance, when the boundary extends to the borders of the image, some embodiments identify the region of interest as the region that is inside the curve of the boundary. When the boundary ends extend to an intersection rather than the image border, some embodiments identify the region of interest as the region inside the closed loop formed by the boundary. Other embodiments might use other techniques (e.g., determinations based on the direction in which the boundary was drawn, properties of the pixels of the two regions, area of the regions, etc.) to identify the region of interest The third stage 260 of FIG. 2 illustrates a mask 220 for image 200 with two mutually exclusive regions based on boundary 205, region of interest 225 and region not of interest 230. In some embodiments, region of interest 225 is the region that is initially defined as the region of interest because it has a smaller area than 225, because of the shape of boundary 205, or for other reasons. Some embodiments allow input from a user to switch the region of interest to the other of the two mutually exclusive regions. For instance, some embodiments provide a user interface tool that would allow a user to define a mask with region 230 as the region of interest for image 200.

Once the boundary defines two mutually exclusive regions, some embodiments allow users to modify the boundary, and thus modify the region of interest (e.g., by selecting and dragging points on the boundary). In some embodiments, the region of interest defined by the boundary is used for editing the image. For instance, some embodiments receive edits (e.g., color correction, adding textures, etc.) to the image through the user interface of the editing application and apply the edits to the region of interest and not to the remainder of the image. Referring again to FIG. 2, edits applied to mask 220 would only be applied to region of interest 225 and would not be applied to the remainder of image 200.

As noted above, some embodiments of the invention are performed by a media-editing application. In some cases the media-editing application is incorporated into another application (such as an operating system of a computer or other device). Furthermore, in other embodiments, the invention is performed by an application other than a media-editing application. Many of the examples below are described in terms of a media-editing application, and in some cases specifically a video-editing application.

The next section, Section I, describes in detail the process of drawing and automatically extending a boundary for an image in order to fully divide the image into two separate regions. Section II then describes the identification of a region of interest based on a boundary and the editing of the image using the region of interest. Section III describes an example of an editing application employing the boundary extension process of some embodiments. Section IV describes the software architecture of and the process of creating such an editing application. Finally, Section V describes the computer system of some embodiments.

I. Automatically Extending a Boundary for an Image

Figure 3:
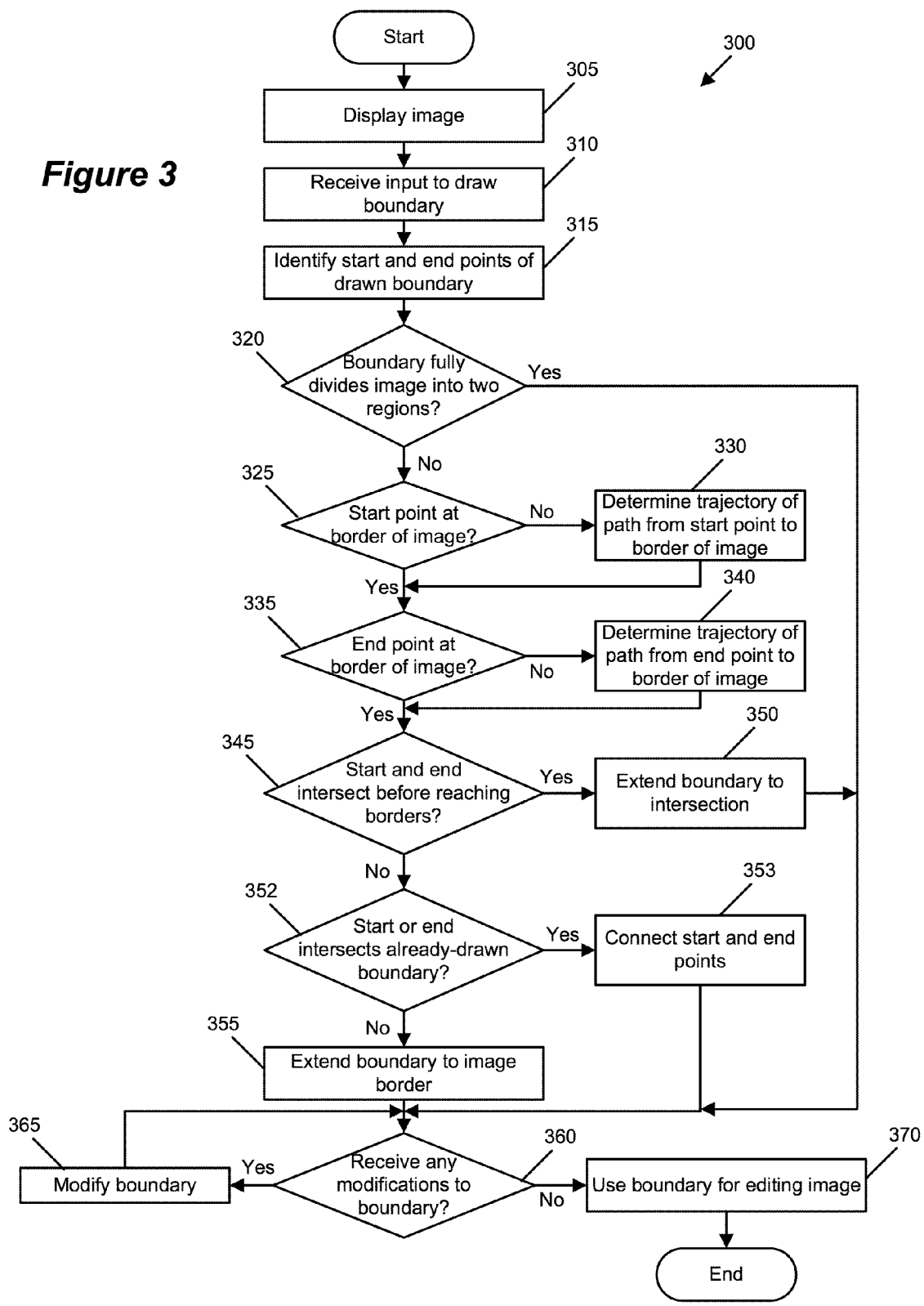
FIG. 3 illustrates a process of some embodiments for automatically extending a boundary if necessary in order to fully divide an image.

As mentioned above, some embodiments receive input of a boundary for an image and automatically extend the boundary so that the boundary fully divides the image into two separate regions. FIG. 3 illustrates a process 300 of some embodiments for automatically extending a boundary if necessary in order to fully divide an image. Process 300 will be described by reference to FIGS. 4-19. In some embodiments, process 300 is performed by a media-editing application, while in other embodiments other applications perform the process.

Figure 4:
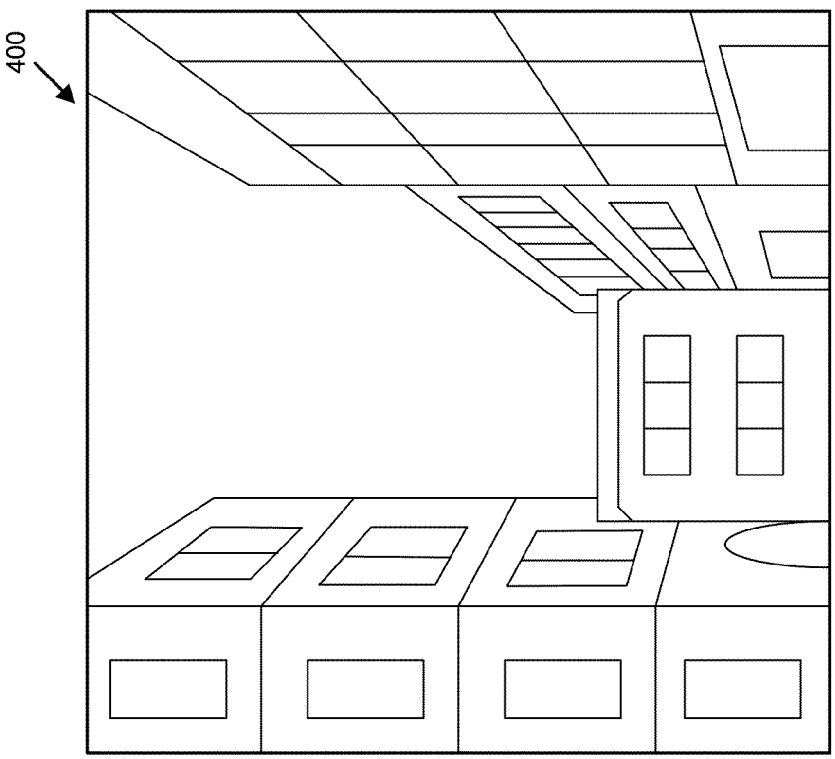
FIG. 4 illustrates an image.

As shown, process 300 displays (at 305) an image. The image, in some embodiments, is a stand-alone image such as a digital photograph (i.e., when the process is performed by an image-editing application such as Apple Aperture®). In other cases, the image is a frame or field of digital video (i.e., when the process is performed by a video-editing application such as Apple Final Cut Pro® or Apple Color®). FIG. 4 illustrates an image 400. Image 400 could be a digital photograph of buildings (or a digitized version of a film photograph), a frame or field of digital video (or a digitized version of analog video), or even a computer-generated stand-alone image or video frame or field.

Next, process 300 receives (at 310) input to draw a boundary for the image. In some embodiments, the input is received from a cursor controller such as a mouse, touchpad, tablet, etc. For instance, in some embodiments, a user uses a mouse to place the cursor over a point in the image, then holds down a mouse button and moves the cursor over the image. The start point of the boundary is the location in the image where the user initially pressed the mouse button. The boundary is then drawn along the path of the cursor over the image. When the user releases the mouse button, the location of the cursor in the image is the end point of the boundary. In other embodiments, other mouse input is used to draw a boundary, such as a first click-and-release for the start point of the boundary and a second click-and-release for the end point of the boundary.

In some embodiments, input can be received from cursor control devices other than a mouse, such as a tablet and stylus. For instance, in some embodiments, when a user touches a stylus to a tablet, the location of the cursor at that time defines the start point of the boundary. The user can then move the stylus along the tablet, and the cursor will move over the image based on this input. When the user removes the stylus from the tablet, the location of the cursor at that time defines the end point of the boundary. One of ordinary skill in the art will recognize that other methods of input using these or other input devices (touchpad, touchscreen etc.) are possible for drawing a boundary. Furthermore, a user could use a touchscreen to draw a boundary even when use of the touchscreen does not actually control a cursor, as the movement of an object (e.g., finger, stylus, etc.) over the touchscreen would be translated into a boundary much like the movement of a cursor.

In some embodiments, as a user moves the cursor across the image (via input from any cursor control device), the boundary drawing process identifies edges of the image near the cursor and snaps the boundary to the identified edges. Some embodiments search for edges in a particularly sized search area around the cursor, and only snap the boundary to edges that are within the search area. In some embodiments, this search area is based on the speed of the cursor. The edges of the image, in some embodiments, are points in the image at which the image brightness has a discontinuity. Various embodiments may use different edge detection algorithms to identify the edges of the image, such as Canny edge detection, differential edge detection, or other such algorithms. Edges may be detected when the image loads or during the boundary drawing process.

To translate the cursor controller input into a boundary for the image, some embodiments define the boundary as an ordered set of coordinates. For example, each pixel over which the cursor moves as the border is drawn is assigned an (x, y) pair. Thus, during the drawing of the boundary, the boundary is defined as the set of coordinates of pixels over which the cursor moves. After the initial drawing process is finished, some embodiments translate the set of coordinates into a function defining a curve, such as one or more spline curves (e.g., bezier splines, b-splines, etc.). Alternatively, a spline may be drawn immediately, in which several individual points are defined, each having unique (x, y) coordinate pairs, and a mathematical function is used to draw a spline between the points.

Figure 5:
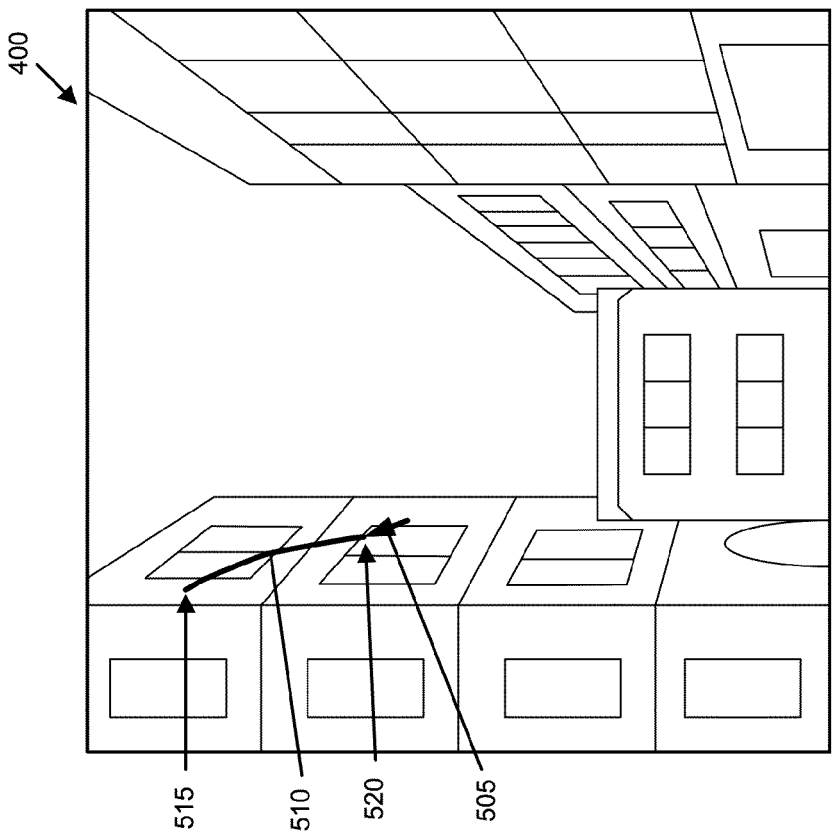

FIGS. 5 and 6 illustrate a boundary 510 drawn for image 400 using a cursor 505. FIG. 5 illustrates the beginning of the drawing of boundary 510. Cursor 505 was placed at start point 515, then traced over the image along a path illustrated by drawn boundary 510. At the point in time illustrated in FIG. 5, the cursor has moved from boundary start point 515 to the present point 520.

FIG. 6 illustrates boundary 510 once the user has finished drawing the boundary by moving the cursor from start point 515, down around the edge of one of the buildings, then back up and to the right around the edges of the other buildings to end point 615. Because boundary 510 does not form a closed loop or start and end at the borders of image 400, boundary 510 does not fully divide image 400 into two separate regions.

Returning to process 300, once the boundary is drawn, the process identifies (at 315) start and end points for the boundary. The start and end points are the two ends of the boundary, where the cursor began and finished its movement over the image in the course of drawing the boundary. In some cases, the start and end points are the same point (i.e., when the boundary forms a closed loop). As noted above, the boundary 510 has start point 515 and end point 615.

Next, the process determines (at 320) whether the boundary as drawn fully divides the image into two separate regions. An image is fully divided by a boundary when the boundary forms a closed loop—that is, the boundary divides the image into an interior region and an exterior region. Furthermore, if both the start point and end point of a boundary lie at the border of the image, then the image is fully divided into two separate regions—one on either side of the boundary. When the boundary fully divides the image into two separate regions, process 300 proceeds to 360, which is described in detail below.

Otherwise, the process determines (at 325) whether the identified start point lies at a border of the image. That is, the process determines whether the cursor was over a border of the image when the input to start drawing the boundary was received. When the start point does not lie at a border of the image, the process determines (at 330) a trajectory of a path from the start point to a border of the image. The trajectory is a path that connects the start point of the boundary to one of the borders of the image.

In some embodiments, the trajectory is a straight line tangent to the path of the boundary at the start point. That is, the path continues, between the start point and the border, in the direction of the boundary at the start point. In other embodiments, the trajectory is a curve that is based on an analysis of the path of the boundary close to the start point. For instance, if the boundary follows a path that curves slightly approaching the start point, then in such embodiments the trajectory will continue this curve between the start point and the border. Yet other embodiments determine the trajectory between the start point and border differently (e.g., by analyzing the content of the image and continuing the path around a particular object or objects in the image).

Next, the process determines (at 335) whether the identified end point lies at a border of the image. That is, the process determines whether the cursor was over a border of the image when the input to finish drawing the boundary was received.

When the end point does not lie at a border of the image, the process determines (at 340) a trajectory of a path from the end point to a border of the image. The trajectory is a path that connects the end point of the boundary to one of the borders of the image.

In some embodiments, the trajectory is a straight line tangent to the path of the boundary at the end point. That is, the path continues, between the end point and the border, in the direction of the boundary at the end point. In other embodiments, the trajectory is a curve that is based on an analysis of the path of the boundary close to the end point. For instance, if the boundary follows a path that curves slightly approaching the end point, then in such embodiments the trajectory will continue this curve between the end point and the border. Yet other embodiments determine the trajectory between the end point and border differently (e.g., by analyzing the content of the image and continuing the path around a particular object or objects in the image).

In some cases, both the start and end points will lie on borders of the image, in which case the boundary fully divides the image into two separate regions. In other cases, only one of the start and end points will lie on a border of the image, in which case only one trajectory between a start/end point and a border will be determined. In still other cases, neither of the end points will lie on a border, and the process will determine the trajectories from both the start and end points to the border.

Next, process 300 determines (at 345) whether the trajectories determined at 330 and 340 intersect before reaching the image borders. When the trajectories cause such an intersection, then the process extends (at 350) the boundary to the intersection point along the path of the determined trajectories before proceeding to 360. Some embodiments display the extensions of the boundary as a dashed line as compared to a solid line for the boundary drawn by cursor movement, while other embodiments display the extension and original boundary as either both solid lines or both dashed lines. One of ordinary skill will recognize that various other embodiments for displaying the boundary are possible.

Figure 8:
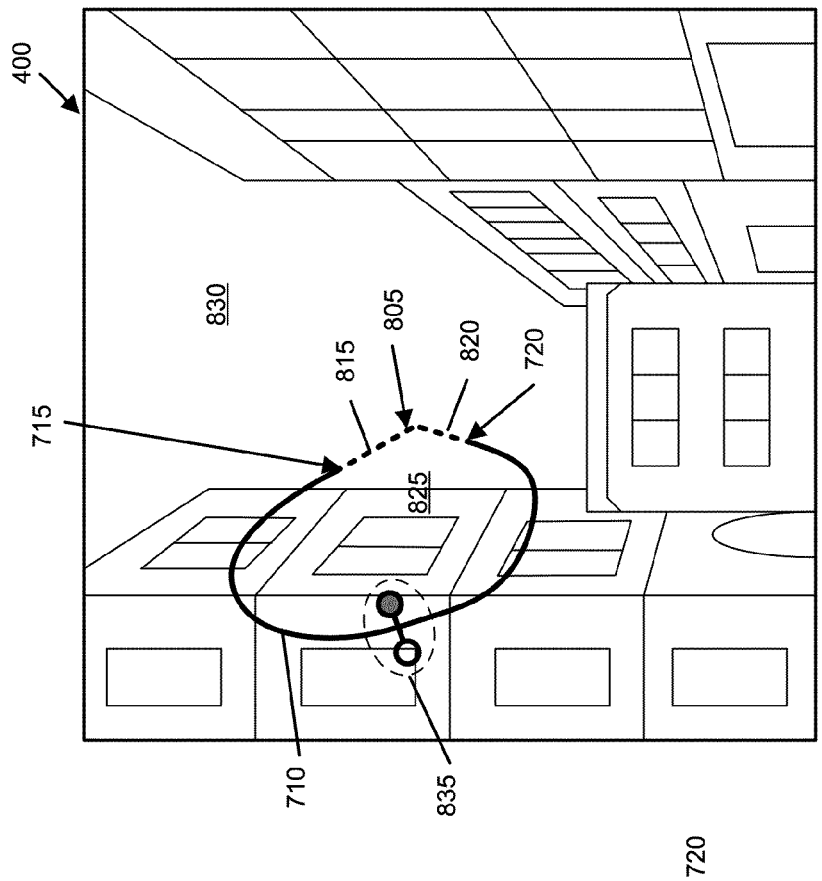
FIG. 8 illustrates the automatic extension of the boundary of FIG. 7 according to some embodiments.
Figure 7:
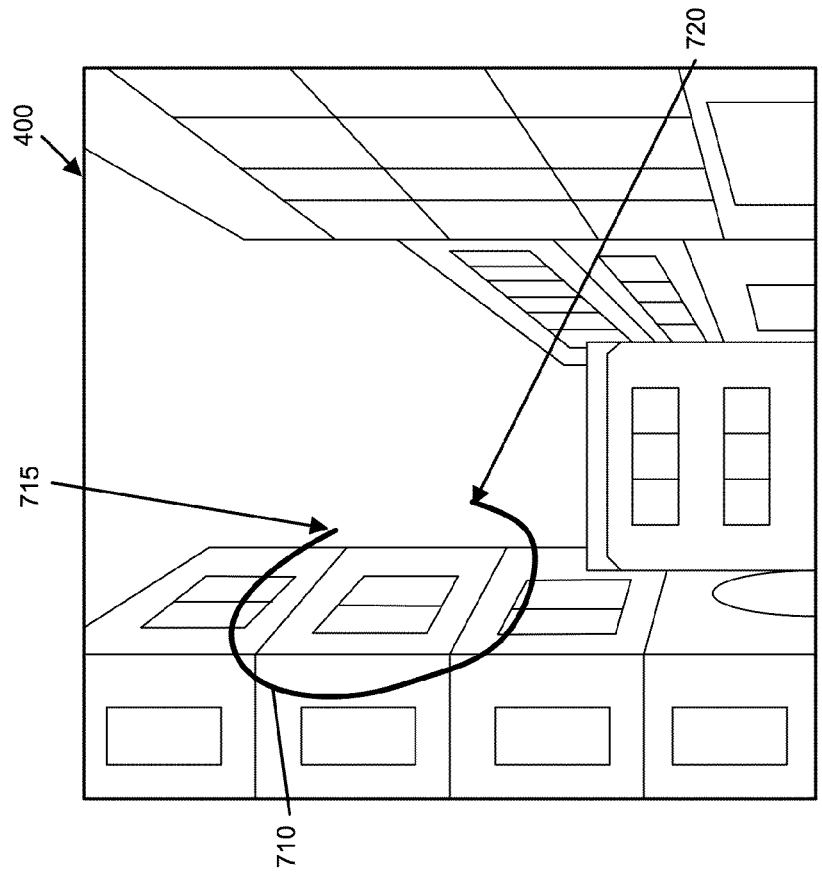
FIG. 7 illustrates a boundary drawn for the image of FIG. 4 that does not fully divide the image into two separate regions.

FIG. 7 illustrates a boundary 710 drawn for image 400 that does not fully divide image 400 into two separate regions. Boundary 710 includes start point 715 and end point 720. Neither the start point or end point of boundary 710 lies on a border of image 400. As such, trajectories are determined extending boundary 710 from start point 715 to the bottom border of image 400 and from end point 720 to the top border of image 400. FIG. 8 illustrates the extension of boundary 710 to the point 805 where the trajectories intersect. Process 300 would draw boundary extension 815 from the start point 715 and extension 820 from the end point 720. With these extensions drawn, boundary 710 now forms a closed loop and thus divides image 400 into a first region 825 and a second region 830.

Process 300 next determines (at 352) whether either the start or the end trajectories intersect the already-drawn boundary. When one or both of the trajectories intersects the already-drawn border, the process connects (at 353) the start and end points before proceeding to 360. Some embodiments connect the start and end points with a straight line. In some embodiments, rather than connecting the two points, a similar process extends one of the trajectories to where it intersects the already-drawn boundary and then removes the remainder of the boundary that is not used to form a closed loop.

Figure 10:
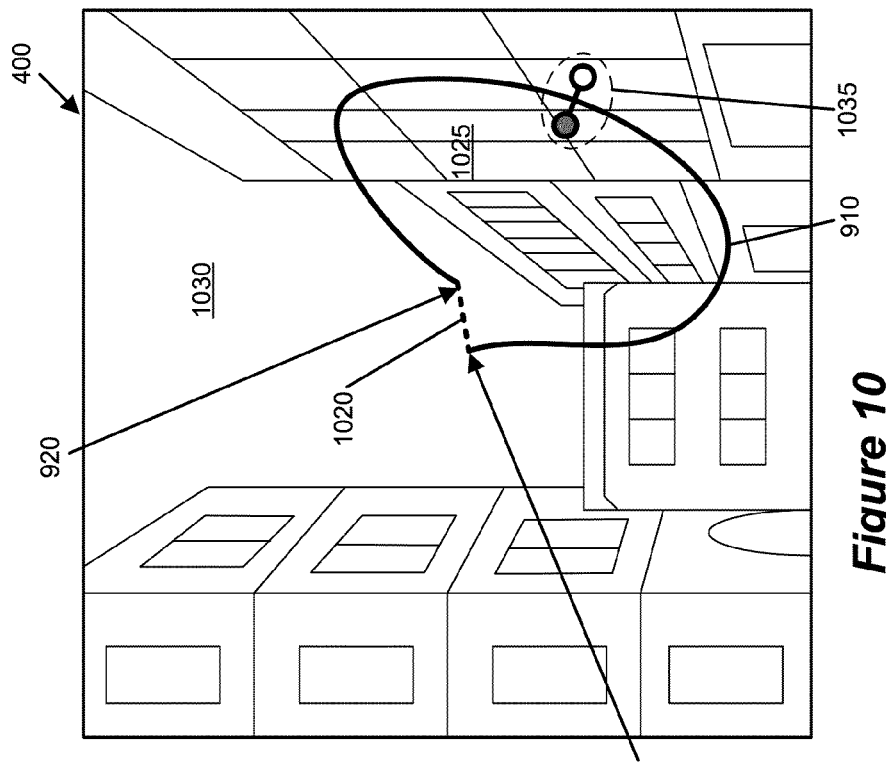
FIG. 10 illustrates the automatic extension of the boundary of FIG. 9 according to some embodiments.
Figure 9:
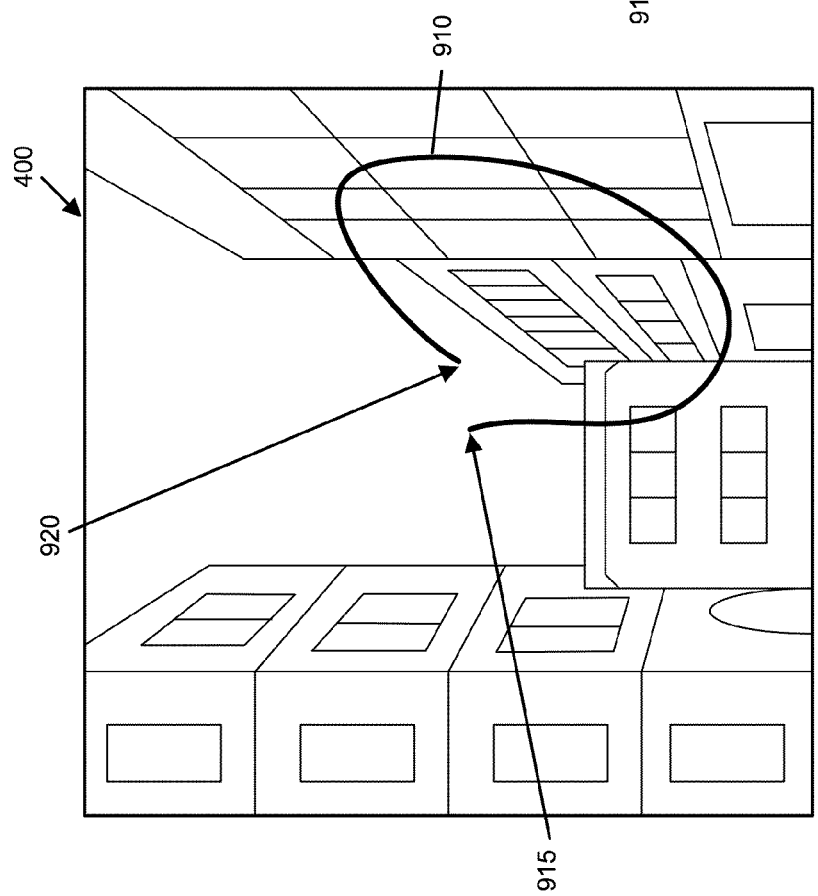
FIG. 9 illustrates a boundary drawn for the image of FIG. 4 that does not fully divide the image into two separate regions.

FIG. 9 illustrates a boundary 910 drawn for image 400 that also does not fully divide image 400 into two separate regions. Boundary 910 includes start point 915 and end point 920. Similar to boundary 710, neither the start point or end point of boundary 910 lies on a border of image 400. As such, trajectories are determined extending boundary 910 from start point 915 to the top border of image 400 and from end point 920 to the bottom border of image 400. The extension of end point 920 intersects the already-drawn boundary 910. FIG. 10 illustrates the connection of start point 915 to end point 920. Process 300 would draw connection 1020 between the start and end points. With this connection drawn, boundary 910 now forms a closed loop and thus divides image 400 into a first region 1025 and a second region 1030.

As noted above, process 300 determines (at 352) whether the trajectories determined at either 330, 340, or both cause an intersection before reaching the borders. When the trajectories do not cause an intersection, the process extends (at 355) the boundary to the borders of the image. Some embodiments display the extensions of the boundary as dashed lines as compared to a solid line for the boundary drawn by cursor movement, while other embodiments display the extensions and original boundary as either both solid lines or both dashed lines. One of ordinary skill will recognize that various other embodiments for displaying the boundary are possible.

FIG. 11 illustrates the extensions of boundary 510 (from FIG. 6) from start point 515 and end point 525 to different points along the top border of image 400. Process 300 would draw boundary extension 1110 from the start point 515 to the border and extension 1120 from the end point 615 to the border. With the extensions drawn, boundary 510 now divides the image 400 into two mutually exclusive regions 1125 and 1130.

One will note that the embodiments illustrated in FIGS. 8, 10, and 11 use straight lines tangent to the ends of the borders that are being extended to determine the trajectory of the extension. As noted above, different embodiments determine these trajectories differently. For example, other embodiments may use a curve based on the curve of the nearby boundary, may extend the boundary based on an analysis of the content of the image, or could even draw a straight line from the start point to the end point of a boundary. Furthermore, some embodiments might extend the boundary in such a way that portions of the drawn boundary are modified as well, such as closing a boundary by snapping the start and end points together and modifying the curve of the boundary near the start and end points in order to do so.

Process 300 next determines (at 360) whether any input is received to modify the boundary. When input is received to modify the boundary, the process modifies (at 365) the boundary in accordance with that input, then returns to 360. In some embodiments, a user might want to use the boundary to define a region of interest for editing the image, and the initial boundary drawn by the user and automatically extended to fully divide the image may not precisely define the desired region of interest.

A user might want to drag the boundary to more precisely enclose a content object or objects (e.g., a person's face, a car, a building, etc.) in the image. In some embodiments, a user can select a point on the boundary and drag the point to a new location, thereby manipulating the boundary in the vicinity of the selected point. To enable better modification, some embodiments treat the boundary as a parametrizable curve with several modifiable points. The parametrizable curve is a bezier spline in some embodiments or a b-spline in other embodiments, or may be a different type of parametrizable curve (e.g., a j-spline, x-spline, Catmull-Rom spline, etc.).

A parametrizable curve is a curve that is defined about certain definition points by a particular equation or set of equations. This is in contrast to a raster curve, which is defined by the set of all pixels that make up the curve. In some embodiments, the parametrizable curve can be modified by moving the definition points. In some embodiments (e.g., embodiments using bezier splines or Catmull-Rom splines), the definition points for modifying the curve lie on the curve. In other embodiments (e.g., embodiments using b-splines), the definition points for modifying the curve lie off of the curve. In addition to the definition points, some embodiments (e.g., embodiments using bezier splines) define the parametrizable curve based on tangents to the curve at the specific points. Users can add definition points to the curve in some embodiments, and then modify the curve based on the new point.

Figure 12:
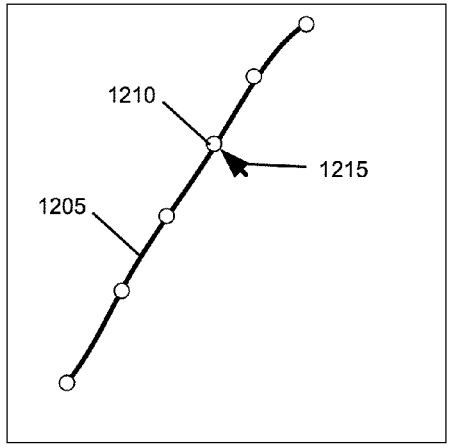
FIGS. 12-15 illustrate the modification of a boundary that is a parametrizable bezier curve.
Figure 13:
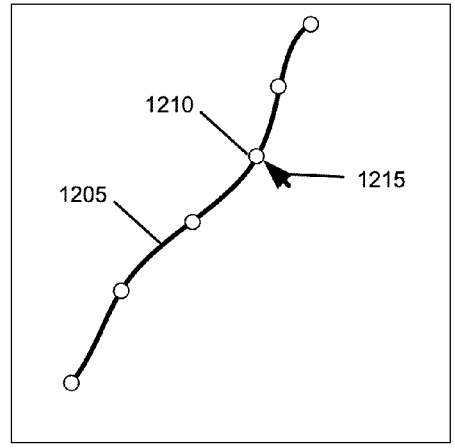

FIG. 12 illustrates a boundary 1205 that is a parametrizable curve that includes definition point 1210 as well as several other definition points. Specifically, boundary 1205 is a bezier spline curve, and as such the definition points are located on the boundary. FIG. 12 also illustrates cursor 1215 that is over definition point 1210. A user controlling cursor 1215 could select definition point 1210 (e.g., by using a click operation) and drag definition point 1210 elsewhere in order to modify the bezier spline. FIG. 13 illustrates the result of a user dragging definition point 1210 down and to the right in order to modify boundary 1205. As shown, in some embodiments, modifying one of the definition points causes modification along other portions of the boundary, including movement of other definition points.

Figure 14:
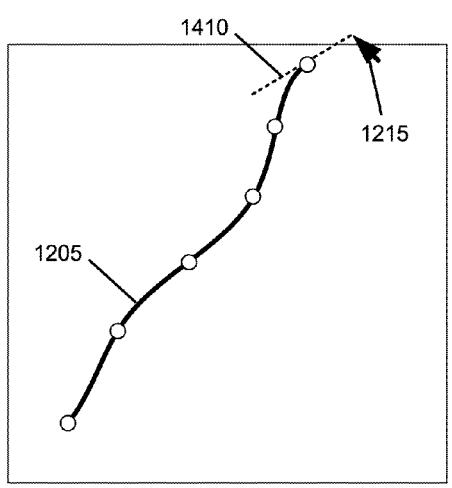
Figure 15:
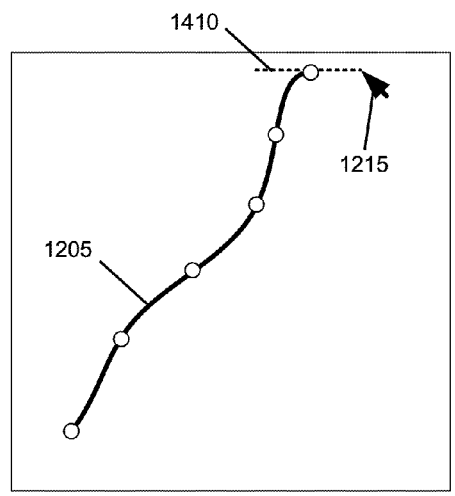

In some embodiments, the tangents of bezier splines can also be used to modify borders defined as bezier splines. Such embodiments display tangents at the definition points and enable a user to rotate the tangents by selecting (e.g., by using a click operation) and dragging the ends of the tangents. FIG. 14 illustrates the boundary 1205 from FIG. 13 with a tangent 1410 displayed at the ending definition point for the boundary. For the sake of simplicity, the other tangents are not shown in this figure. FIG. 15 illustrates the result of a user rotating tangent 1410 by selecting the tangent and dragging it in a clockwise direction with cursor 1215. As shown, in some embodiments, modifying the tangents causes modification along other portions of the boundary, including movement of other definition points. In both the case of modifying via the tangents and the case of modifying via the definition points, the rest of the boundary is modified according to the mathematics of bezier splines, which is well known in the art.

Figure 16:
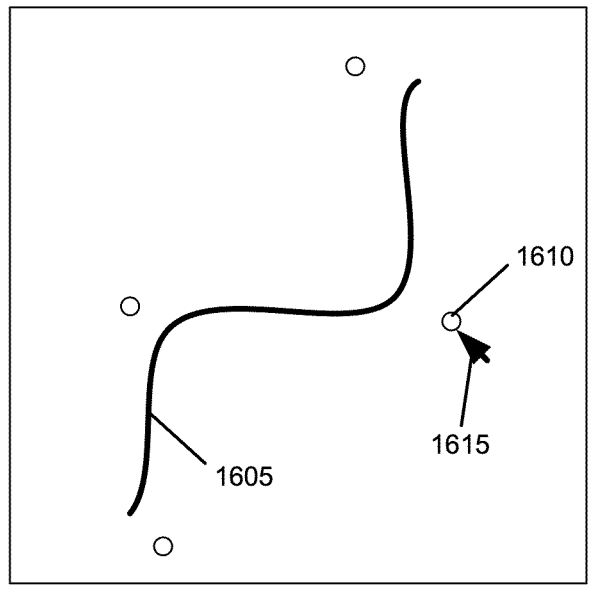
FIGS. 16-17 illustrate the modification of a boundary that is a b-spline.
Figure 17:
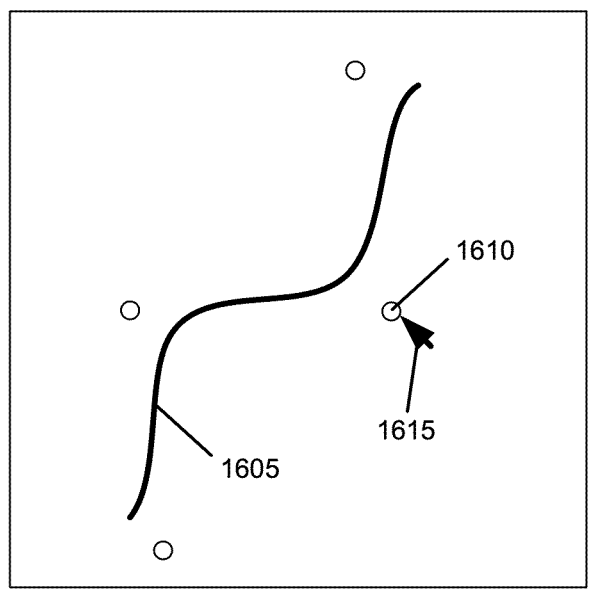

FIG. 16 illustrates a boundary 1605 that is a parametrizable curve defined by definition point 1610 as well as several other definition points. Specifically, boundary 1605 is a b-spline curve, and as such the definition points are not located on the boundary. FIG. 16 also illustrates cursor 1615 that is over definition point 1610. A user controlling cursor 1615 could select definition point 1610 (e.g., by using a click operation) and drag definition point 1610 elsewhere in order to modify the bezier spline. FIG. 17 illustrates the result of a user dragging definition point 1610 up and to the left in order to modify boundary 1605. As shown, in some embodiments, modifying one of the definition points causes modification along other portions of the boundary, including movement of other definition points. The boundary is modified according to the mathematics of b-splines, which is well known in the art.

Figure 18:
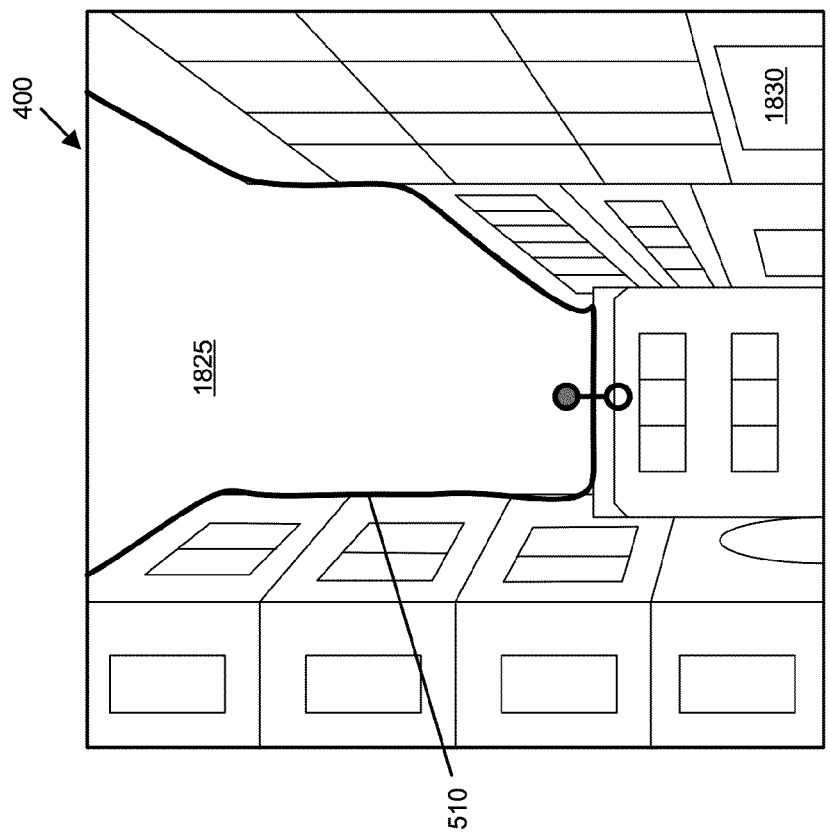
FIG. 18 illustrates a first modification of the boundary of FIG. 11.

FIG. 18 illustrates the boundary 510 from FIG. 11 after it has been modified by a user to more accurately divide the image 400 into a first region including only the sky (region 1825) and a second region including the remainder of the image (region 1830, which is all of the buildings). Boundary 510 could have been modified by a user selecting various points on the boundary and dragging the selected points near the edges between the sky and the buildings.

Figure 19:
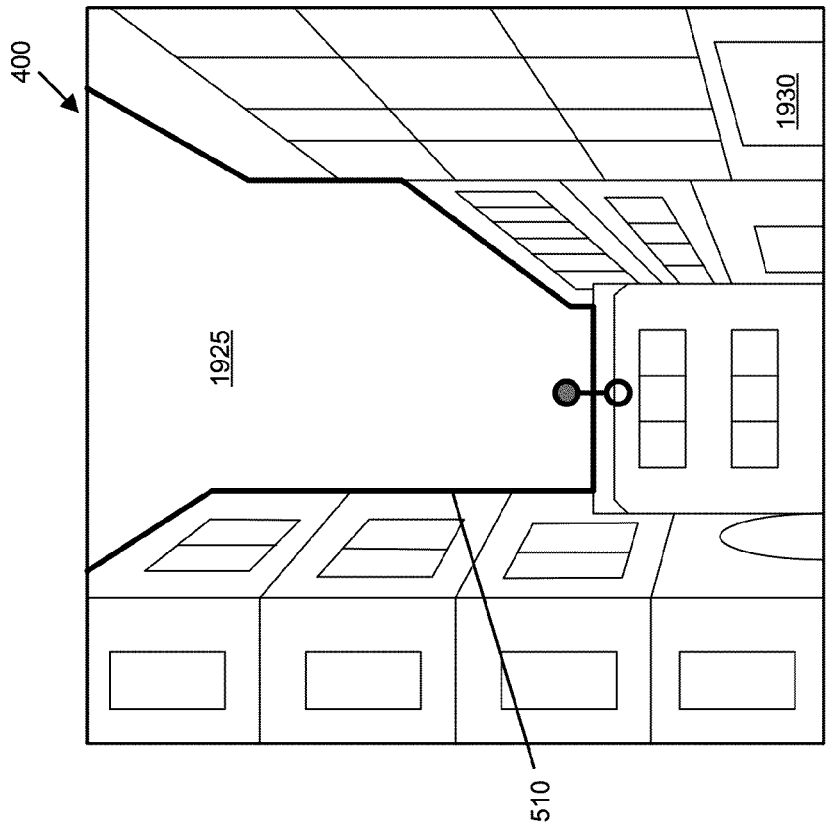
FIG. 19 illustrates a second modification of the boundary of FIG. 11.

Some embodiments search for edges of an image as a user modifies a boundary for the image and snap the boundary to identified edges. In some embodiments, this feature is user-selectable, in that a user can choose whether the boundary should snap to edges or not. FIG. 19 illustrates boundary 510 after it has been modified in the case where the boundary is snapped to identified edges. In this case, boundary 1125 even more accurately divides image 400 into a first region including only the sky (region 1925) and a second region including the remainder of the image (region 1930). As illustrated by the sharp corners in boundary 510 as modified in FIG. 19, some embodiments do not require that the entire boundary be one parametrizable curve, but instead allow for the boundary to be a set of such curves.

Returning to process 300, once the boundary is fully modified, the process uses (at 370) the boundary for editing the image, then ends. In some embodiments, this includes defining a region of interest of the image, receiving edits (e.g., color correction, special effects, etc.), and only applying the edits to the region of interest. The editing of an image based on a boundary is described in further detail below in Section II.

II. Defining a Region of Interest and Editing an Image

Once a boundary is drawn for an image, some embodiments use the boundary to affect editing of the image. Specifically, when the boundary separates the image into two mutually exclusive regions, some embodiments define one of these regions as a region of interest for the image. When edits to the image are received (e.g., color corrections, special effects, etc.), some embodiments only apply these edits to the region of interest.

Figure 20:
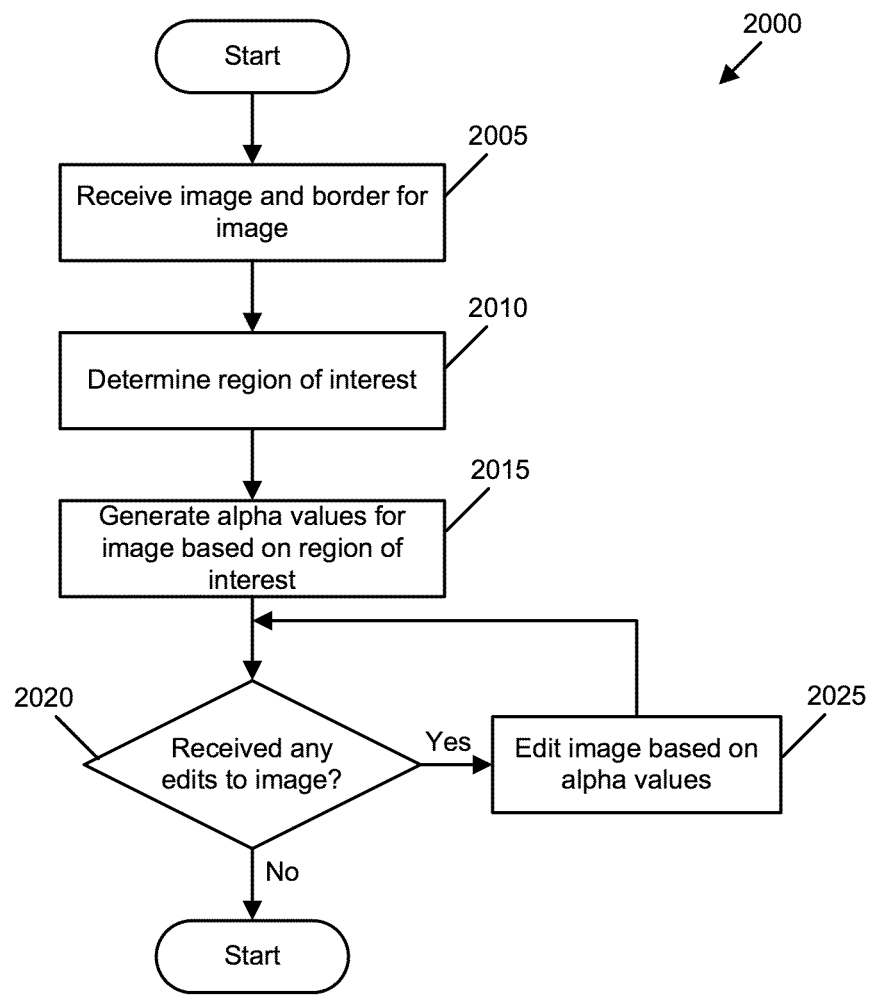
FIG. 20 illustrates a process of some embodiments for editing an image using a boundary for the image.

FIG. 20 illustrates a process 2000 of some embodiments for editing an image using a boundary for the image. As shown, process 2000 receives (at 2005) an image and a boundary for the image. The image, in some embodiments, is a stand-alone image such as a digital photograph, a digitized version of a film photograph, or a computer-generated image (i.e., when the process is performed by an image-editing application such as Apple Aperture™). In other cases, the image is a frame or field of digital video, a digitized version of analog video, or even a computer-generated video frame or field (i.e., when the process is performed by a video-editing application such as Apple Final Cut Pro® or Apple Color®).

The boundary, in some embodiments, was drawn according to process 300. As such, in some cases the boundary was automatically extended either to the border of the image or to a point at which it intersects itself. In such embodiments, the boundary will fully divide the image into two separate regions. The boundary may also have been modified (e.g., by bezier manipulation) by a user in order to more precisely divide the image into two regions as desired.

Next, process 2000 determines (at 2010) a region of interest for the image. The region of interest, in some embodiments, is one of the two regions defined by the boundary. In determining which of the two regions is the region of interest, different embodiments use different techniques. For instance, in cases in which the boundary forms a closed loop, some embodiments define the region interior to the boundary as the region of interest.

A variety of different techniques can be used to determine which region should be the region of interest when the boundary extends to the borders of the image (and thus does not form a closed loop. Some embodiments define the region of interest based on the curve of the boundary. Specifically, some embodiments determine an "interior" region based on the curve of the boundary, and define this region as the region of interest. In the example of FIG. 11, region 1125 is the interior region thus defined because the boundary is predominantly facing upwards (that is, the second derivative of the curve is positive for most of the length of the boundary).

Some embodiments define the region with the smaller area of the two as the region of interest. Others determine the shortest path along the image border between the two points where the boundary intersects the border, then use this path along with the boundary to determine an interior region that is the region of interest. Again referring to FIG. 11, such a method would define region 1125 as the region of interest because the boundary 510 would be connected along the top border. Some embodiments assign a direction to the boundary based on the drawing of the boundary and then assign the region of interest as being on either the left or right side of the boundary. In FIG. 11, because the boundary started at point 515 and ended at point 615, region 1125 is to the left of the boundary and region 1130 is to the right. One of ordinary skill will recognize that other embodiments might use other techniques to define the region of interest based on a boundary.

Some embodiments allow users to toggle which of the two regions is the region of interest. In some cases, a user interface tool is provided to enable a user to toggle the region of interest. For instance, FIGS. 8, 10, and 11 illustrate user interface tools 835, 1035, and 1135 respectively. These tools have a filled circle on one side of the boundary and an unfilled circle on the other side of the boundary with a line connecting them. In this case, the filled circle indicates the region of interest, and in order to toggle the region of interest a user can select the unfilled circle. When a user does so, the unfilled circle will be filled in and the filled circle will become unfilled, and the region of interest will be switched. Other embodiments use other user interface tools for this purpose. For instance, different shapes other than circles could be used, the filled and unfilled circles could be switched in meaning, a tool could be provided outside of the image to toggle the region of interest, etc.

Returning to FIG. 20, process 2000 next generates (at 2015) alpha values for the image based on the region of interest. In some embodiments, an alpha value for a particular pixel defines whether (and to what extent) edits apply to the particular pixel. For instance, some embodiments define all pixels as having either alpha values of 1 or 0. Edits are applied only to the pixels with an alpha value of 1. As such, all pixels in the region of interest are assigned an alpha value of 1 while all other pixels are assigned an alpha value of 0. Some embodiments assign an alpha value of 1 to the boundary pixels, while others assign these pixels an alpha value of 0.

Alpha values can also be thought of as defining a mask, where the alpha value of a particular pixel defines the transparency of the mask at that particular pixel. Edits are applied to the mask, but at the transparent pixels the underlying original image is viewable whereas at the non-transparent pixels the edited image is viewable. Accordingly, the transparent pixels have an alpha value of 0 while the non-transparent pixels have an alpha value of 1.

Figure 22:
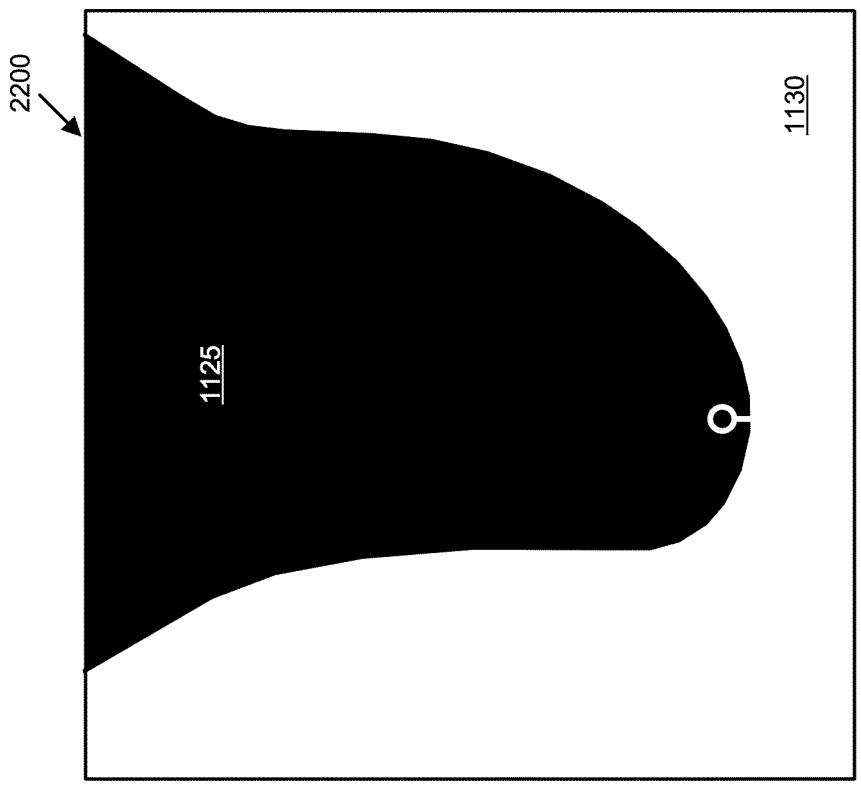
FIGS. 21-22 illustrate masks based on the boundary of FIG. 11.
Figure 21:
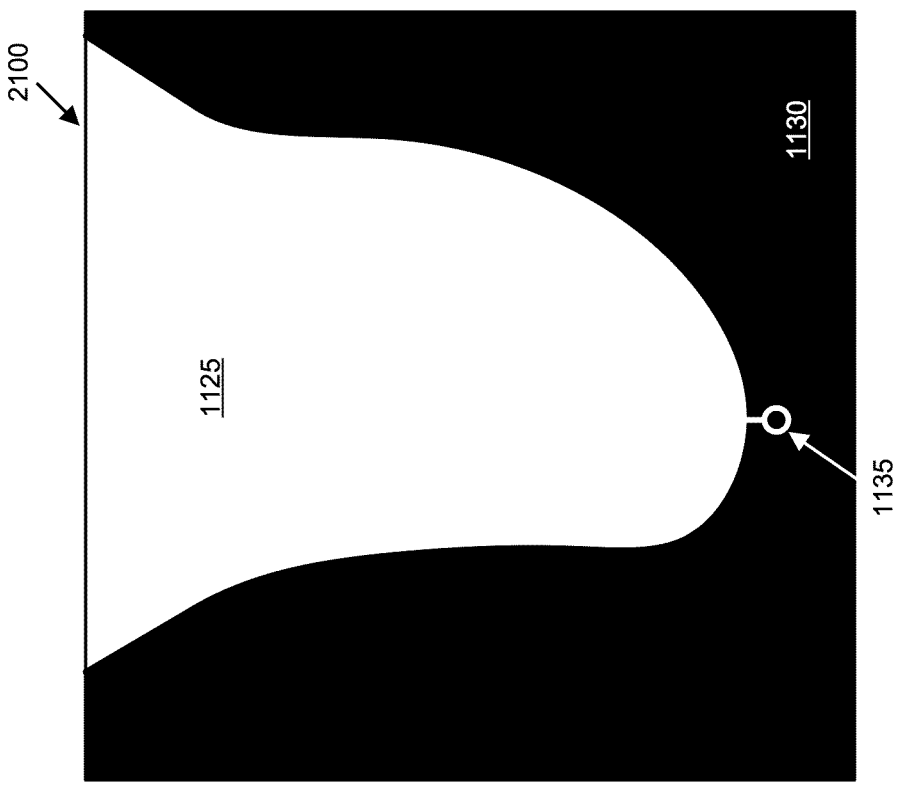

FIG. 21 illustrates a mask 2100 based on the boundary 510 of FIG. 11. In mask 2100, the region of interest 1125 is displayed as white (alpha=1) and the other region 1130 is displayed as black (alpha=0). Edits applied to this mask will only affect the pixels displayed as white (in region of interest 1125). FIG. 22 illustrates a mask 2200 after a user has selected user interface tool 1135 in order to toggle the region of interest. As shown, in some embodiments, when displaying a mask, user interface tool 1135 is displayed entirely in white so that a user can click on it in the black (non-region of interest) section of the mask in order to toggle the region of interest.

In mask 2200, region 1130 is now the region of interest and is displayed as white (alpha=1) while region 1125 is displayed as black (alpha=0). Edits applied to mask 2200 will only affect the pixels in region of interest 1130. If a user wants to apply a first set of edits to a first region and a second set of edits to the rest of the image (a second region), the user can generate a mask in which the first region of interest, perform the first set of edits, then toggle the region of interest and perform the second set of edits which will be applied to the second region.

Figure 23:
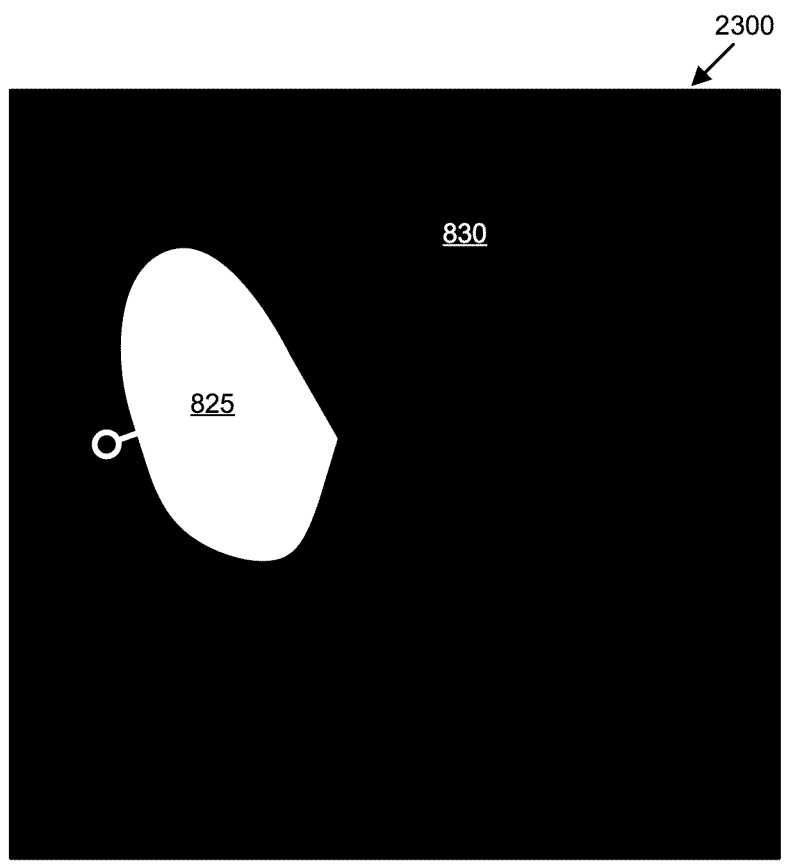
FIG. 23 illustrates a mask based on the boundary of FIG. 8.

FIG. 23 illustrates a mask 2300 based on the boundary 710 of FIG. 8. Because boundary 710 forms a closed loop, the interior region 825 is defined to be the region of interest. As such, region 825 is displayed as white (alpha=1) in mask 2300 while region 830 is displayed as black (alpha=0). Edits applied to this mask will only affect the pixels displayed as white (region of interest 825)

Some embodiments allow for alpha values that are between 0 and 1 (e.g., 0.2, 0.75, etc.). For instance, to account for the fact that a boundary may not perfectly demarcate a desired region for editing from the rest of the image (e.g., in FIG. 18, boundary 510 does not perfectly demarcate the sky from the rest of the image), some embodiments define a region on either side of the boundary that is neither definitely in or out of the region of interest. Pixels in the region of interest and outside the region of interest are sampled and then each pixel in the boundary-region is assigned an alpha value based on a comparison to the samples. If the compared attributes (e.g., RGB values, luma values, chroma values, etc.) of a particular pixel in the boundary region are very close to the attributes of the sampled pixels from the region of interest, then the particular pixel is assigned an alpha value close to 1. Similarly, if the compared attributes are very close to the attributes of the sampled pixels from the region that is not the region of interest, then the particular pixel is assigned an alpha value close to 0. In such cases, the alpha value of a pixel specifies the extent to which edits apply to the pixel. For instance, a color correction edit would apply fully to a pixel with an alpha value of 1, not at all to a pixel with an alpha value of 0, and partly to a pixel with an alpha value of 0.4 (but less than to a pixel with an alpha value of 0.7).

Process 2000 next determines (at 2020) whether any edits to the image have been received. When edits are received, the process edits (at 2025) the image based on the alpha values and returns to 2020. Once all edits are received and processed, the process ends. Editing the image based on the alpha values refers to the fact that the edits are applied to each pixel in the image to an extent determined by the alpha values of the pixels.

A variety of different types of edits to the image are possible in some embodiments. For instance, some embodiments allow color correction of the image. Color correction refers to the the modification of color properties of the image. Color properties can include RGB values, luma (Y') values, chroma (Cb and Cr) values, as well as other properties such as saturation, hue shift, gain, etc. Some embodiments allow the application of effects to the image. For instance, different textures can be applied to an image. One of ordinary skill in the art will recognize that other image manipulation options will be possible in some embodiments, depending on the application employing the described processes.

III. Image-Editing Application

As noted above, some embodiments of the invention are performed by a media-editing application (e.g., an image-editing or video-editing application). The media-editing application of some embodiments performs process 300, process 2000, or both, in order to edit an image (a stand-alone image or a video picture). As discussed, the media-editing application is a stand-alone application in some embodiments and is integrated into another application (e.g., an operating system of a computer or other device) in other embodiments.

Figure 24:
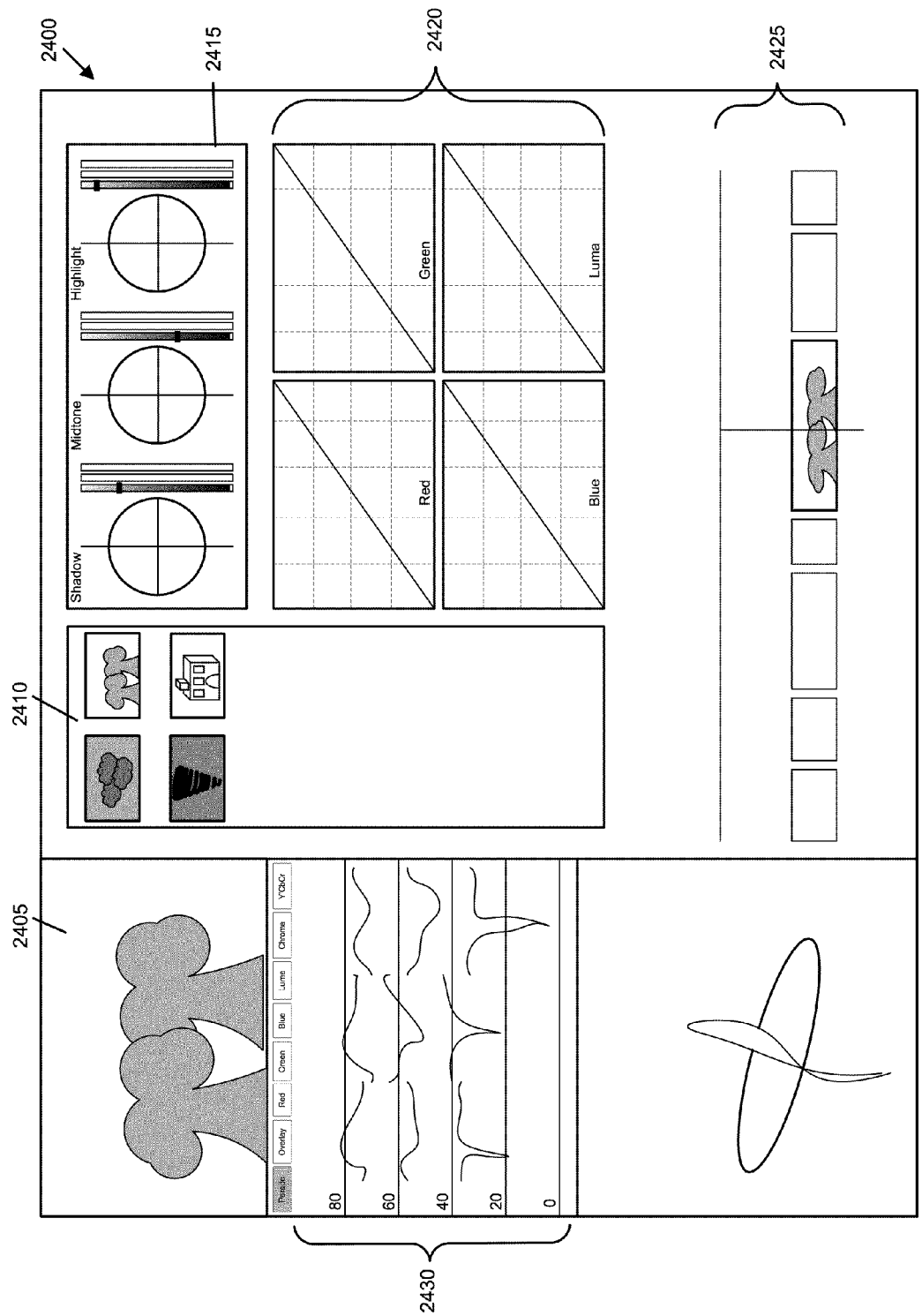
FIG. 24 illustrates a media-editing application of some embodiments.

FIG. 24 illustrates a video-editing application 2400 of some embodiments. While FIG. 24 (and subsequent FIGS. 25-28) illustrates a video-editing application, one of ordinary skill in the art will recognize that the same or similar features (e.g., color correction tools) will be present in image-editing applications that embody the invention as well.

Video-editing application 2400 includes an editing window 2405, a selectable set of clips 2410, a first set of color correction tools 2415, a second set of color correction tools 2420, an ordered set of clips 2425, and indicator graphs 2430. The editing window 2405 displays an image (i.e., a frame or field) of a video clip that is presently being edited. In some embodiments, a user can view edits to the image as the various editing tools are used in order to judge whether the edit is actually desired. A user can draw a boundary for the image in window 2405 in order to define a region of interest for the image. Some embodiments of the video editing application perform process 2000 to automatically extend the boundary if necessary to fully divide the region into two separate regions. The video editing application also performs process 300 in some embodiments to define alpha values based on the boundary and use the alpha values in editing the image.

The set of selectable clips 2410 includes a set of clips that are available to a user for editing. In some cases, the clips 2410 are unrelated video clips that can be individually edited by the user. In other cases, the clips 2410 are different video clips within a video project. For instance, some embodiments of the video-editing application are a color grading application that is for use after a user has put together a video project using a non-linear editor. In some such embodiments, the clips 2410 are some or all of the different clips that make up the video project.

The first set of color correction tools 2415 includes color wheels and sliders for editing shadow, midtone, and highlight in the image displayed in editing window 2405. The second set of color correction tools 2420 includes curves for adjusting red, green, blue, and luma values. Adjusting the red curve, for instance, will only affect the red values of the pixels in the image displayed in editing window 2405. When a region of interest is defined for the image, then adjusting the red curve will only affect the red values of the pixels in the region of interest. The indicator graphs 2430 illustrate the spread of color values throughout the image displayed in editing window 2405.

As shown in FIG. 24, three graphs (for red, green, and blue values) are displayed. Selecting one of the items above the indicator graphs (overlay, red, green, blue, luma, chroma, Y'CbCr) will display a graph for just the selected item. In some embodiments, edits made using the sets of color correction tools are reflected in the graphs 2430. For instance, edits made using the red curve will modify the indicator graph for the red values.

In some embodiments, an edit made to the image displayed in editing window 2405 is in fact made for the entire video clip of which the image is a part. While this is not difficult for edits applied to the entire image, a region of interest will often move throughout the course of a video clip. For instance, if the region of interest is a person, then the person may move during the course of the video clip. Some embodiments can recognize this motion (via edge detection, color value comparisons, or other techniques) and move the region of interest along with a particular object or objects in a video clip.

The ordered set of clips 2425, or timeline, shows the various video clips of the video project that is being edited. The clips 2425 are displayed based on their order in the video project. In some embodiments, a video project will have more clips than can be shown in the timeline 2425, and as such a scrollbar can be used to scroll through the clips. Some embodiments also save edits that are made to one video clip, and a user can drag icons representing those edits from one clip to the next in order to create uniform coloration throughout a section of a video project.

Figure 25:
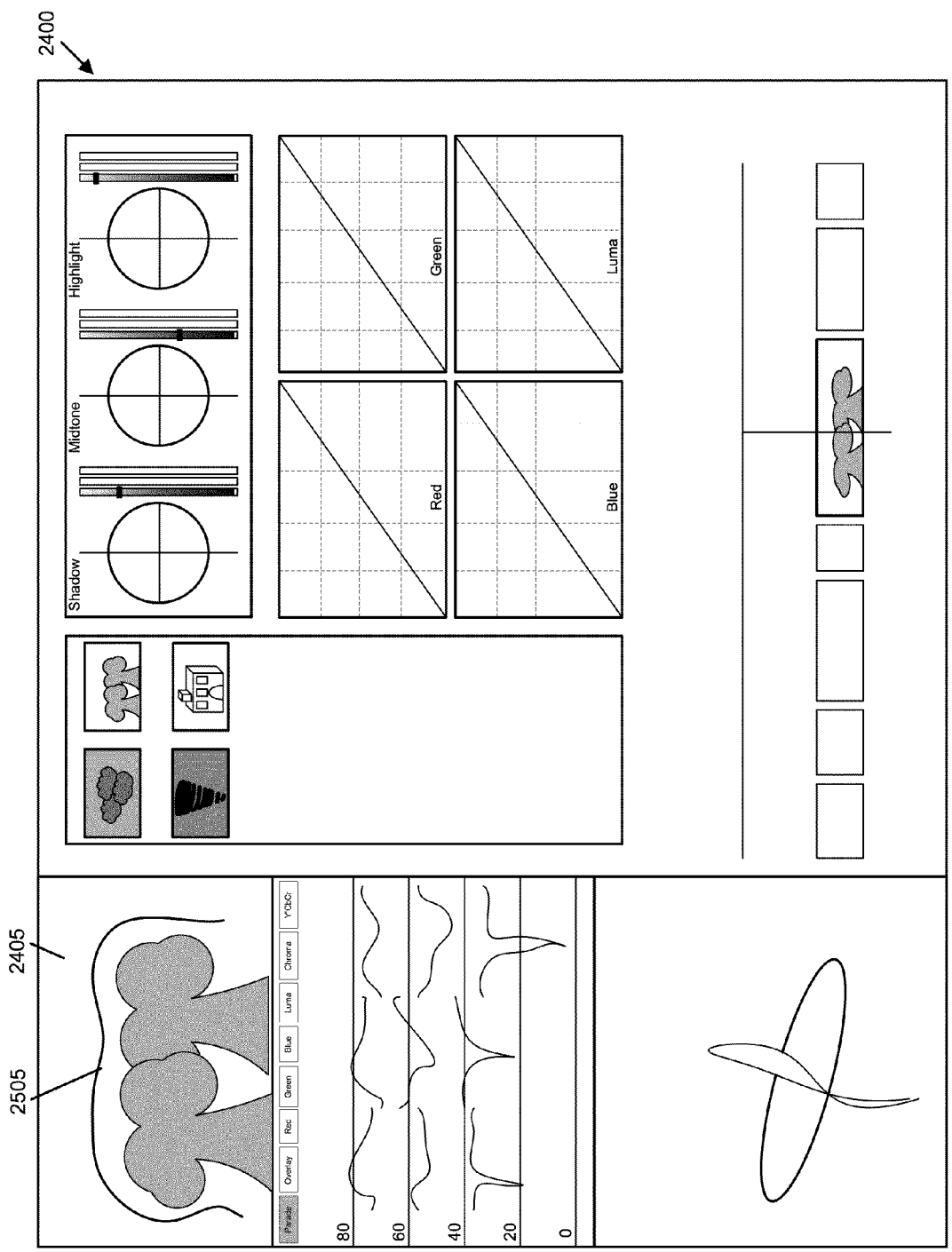
FIGS. 25-28 illustrate using the media-editing application of FIG. 24 to draw a boundary for an image and edit the image based on the boundary.
Figure 26:
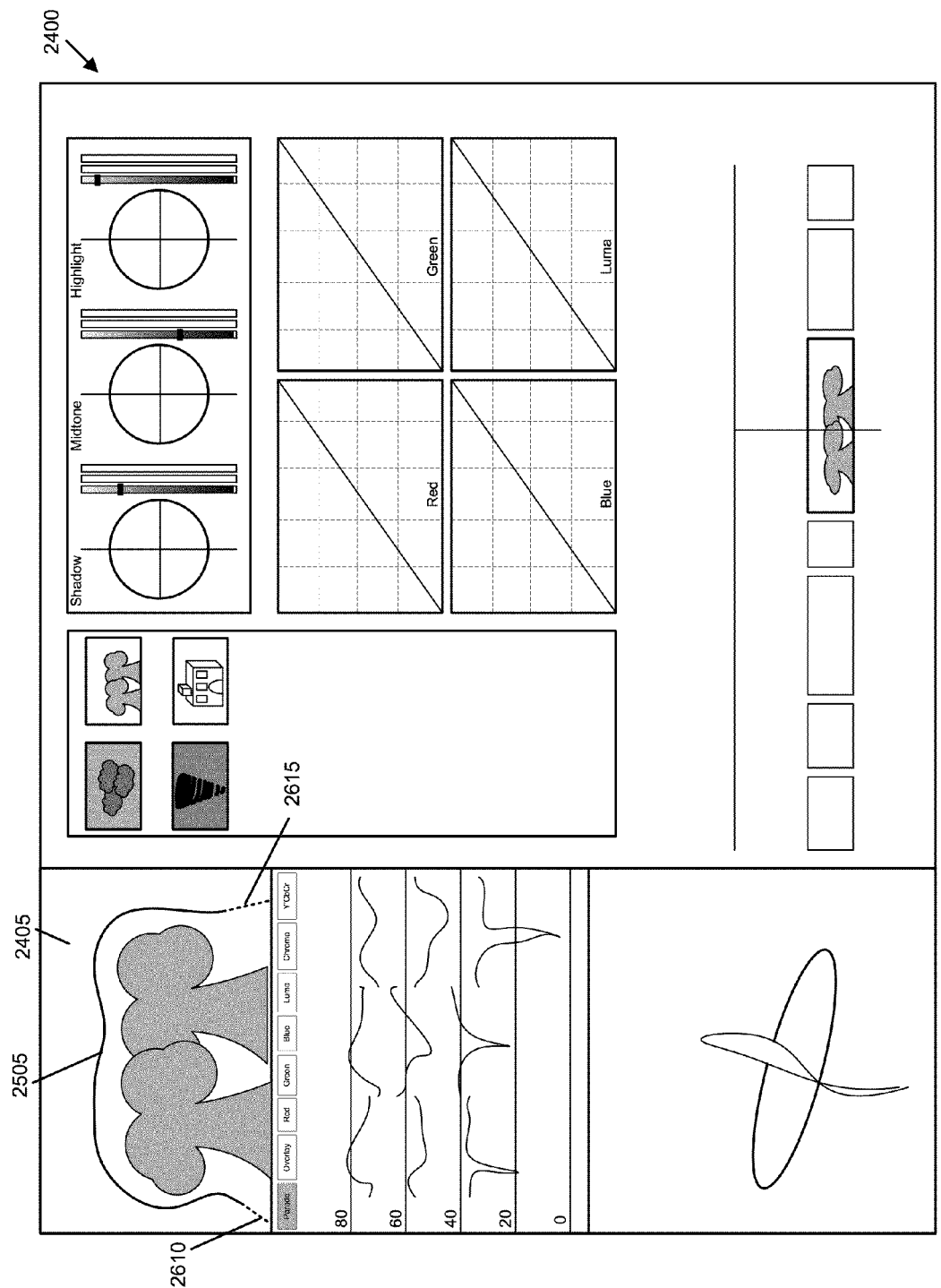

FIGS. 25-28 illustrate the use of a boundary to define a region of interest and edit an image in the context of the video editing application 2400. FIG. 25 illustrates a boundary 2505 that is drawn for the image in editing window 2405. The boundary could be drawn by a user tracing a cursor over the image with a cursor controller, as described above in Section I. FIG. 26 illustrates the extension of boundary 2505 to the borders of the image with extension sections 2610 and 2615. The boundary is extended according to process 2000 in some embodiments to fully divide the image into two separate regions.

Figure 27:
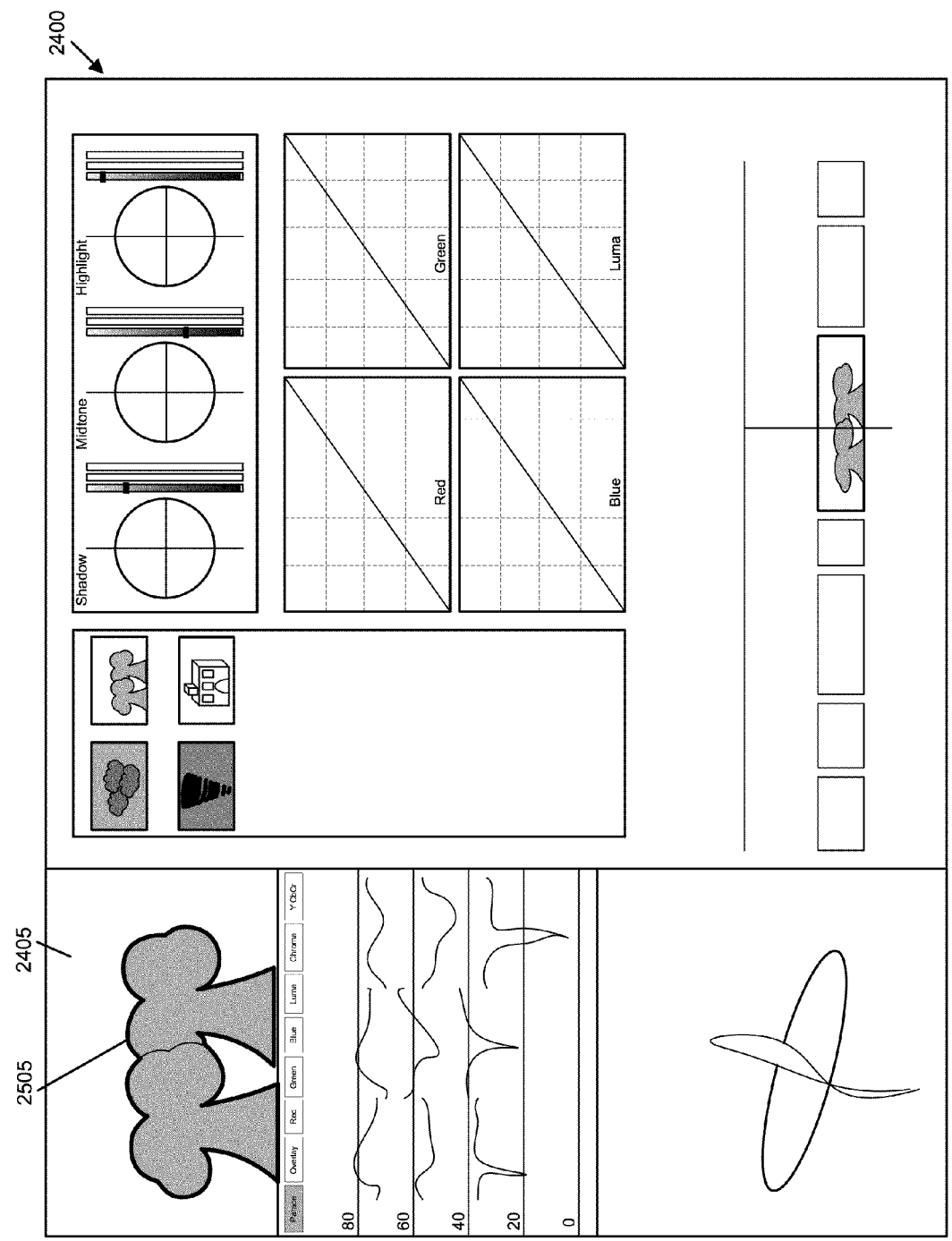
Figure 28:
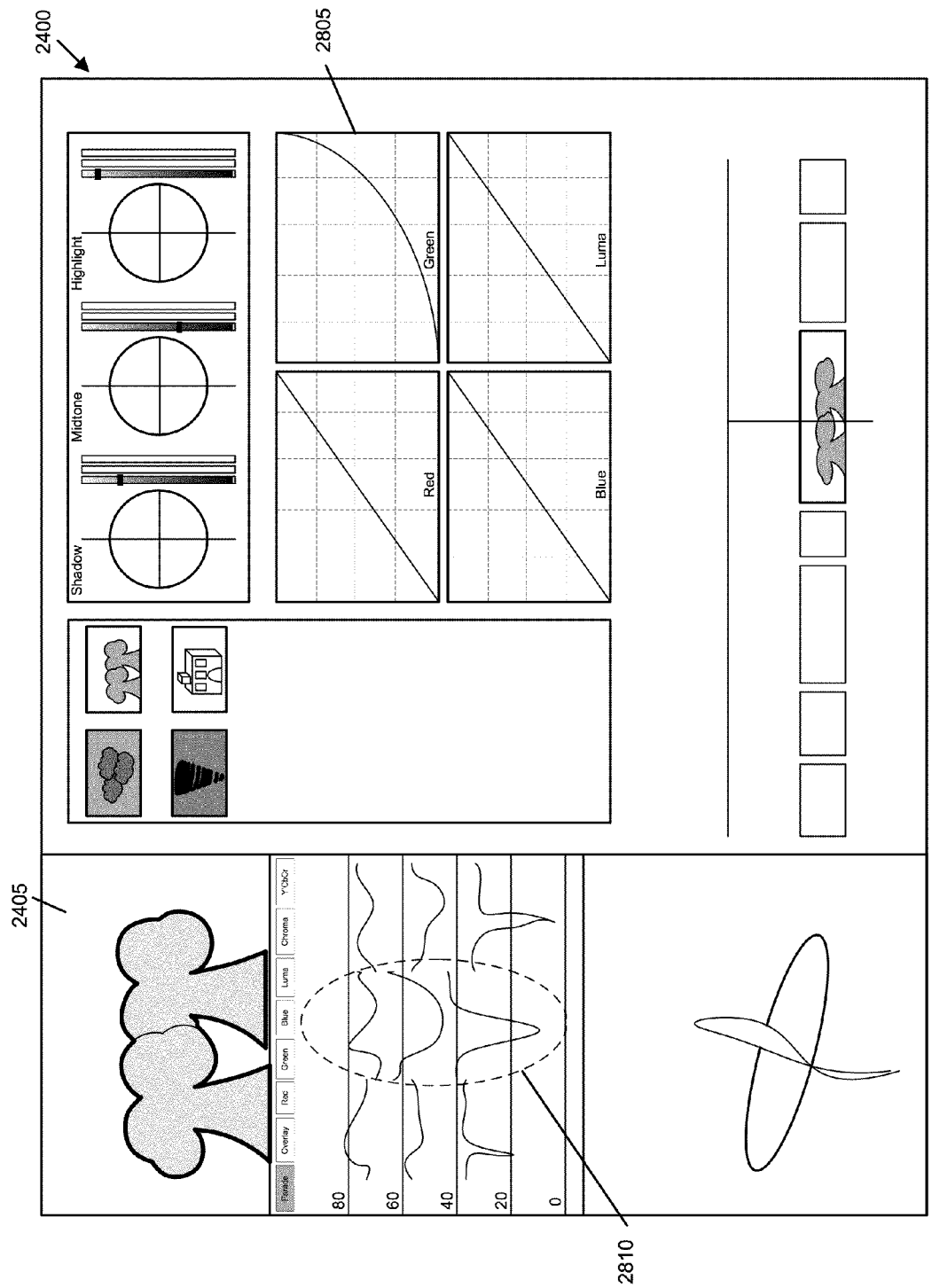

FIG. 27 illustrates boundary 2505 after a user has modified the boundary (e.g., by dragging various points, possibly snapping the boundary to the edges between the trees and the background, etc.) to more precisely define the region of interest as being only the trees. FIG. 28 illustrates the use of the color correction tools of video-editing application 2400 to edit the region of interest of the image displayed in editing window 2405. The green graph 2805 has been modified to lower the green values for all pixels in the region of interest. As such, the indicator graphs 2810 for the green values have changed, and the green trees are now lighter in color in editing window 2405.

Many of the features present in video-editing application 2400 could also be present in an image-editing application. All of the color correction tools 2415 and 2420 are equally applicable to stand-alone images that could also be displayed in an image-editing window such as window 2405. Much as there is a set of selectable clips 2410 in video-editing application 2400, an image-editing application would have a set of selectable images. The boundary drawing, extension, and modification process and the editing process are also equally applicable to an image-editing application.

One of ordinary skill will recognize that the media-editing tools and processes that are described above can be incorporated into any media-editing application by way of a plug-in, applet, or direct function incorporated within the application itself. Accordingly, different image-editing applications (e.g., Apple Aperture®, Apple iPhoto®, Adobe Photoshop®, Adobe Lightroom®, etc.) or video-editing applications (e.g., Apple Final Cut Pro®, Apple Color®, Avid®, etc.) may each implement one or more of the image-editing tools described herein. Additionally, the image-editing tools and processes described above and below can be incorporated within the functionality of any other application (e.g., digital photo albums, etc.), or within an operating system (e.g., Microsoft Windows®, Apple Mac OS®, etc.).

Furthermore, one of ordinary skill will recognize that many image- and video-editing features not shown in 2400 may also be part of a media-editing application that incorporates the invention. For instance, some embodiments might have other color correction tools, such as ways to change saturation, hue, balance, etc., or might have tools for adding various effects to an image or a region of interest of an image.

IV. Software Architecture

Figure 29:
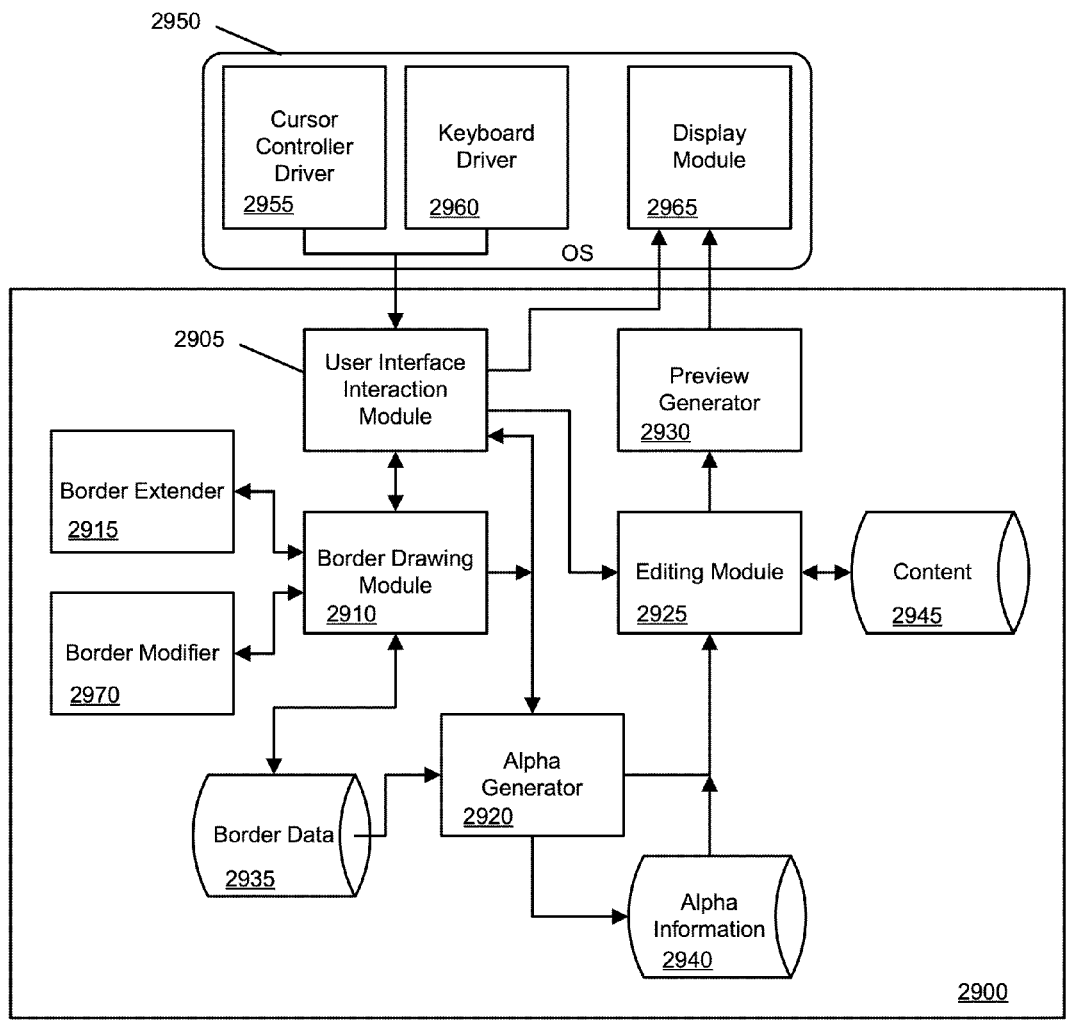
FIG. 29 conceptually illustrates the software architecture of a media-editing application of some embodiments.

In some embodiments, the processes described above are implemented as software running on a particular machine, such as a computer or a handheld device, or stored in a computer readable medium. FIG. 29 conceptually illustrates the software architecture of a media-editing application 2900 of some embodiments for editing images and/or videos. In some embodiments, the application is a stand-alone application or is integrated into another application (for instance, the modules illustrated in FIG. 29 might only be a subset of the modules in a media-editing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

Media-editing application 2900 includes a user interface (UI) interaction module 2905, a boundary drawing module 2910, a boundary extender 2915, a boundary modifier 2970, an alpha generator 2920, an editing module 2925, and and a preview generator 2930. The media-editing application also includes boundary data storage 2935, alpha information storage 2940, and content storage 2945. In some embodiments, all three of these storages are actually one physical storage, while in other embodiments they are separate, as shown. Some embodiments also store two of the groups of information (e.g., the boundary data and alpha information) together, while the other is in a separate storage. FIG. 29 also illustrates an operating system 2950 that includes cursor controller driver 2955, keyboard driver 2960, and display module 2965. In some embodiments, as illustrated, the cursor controller driver 2955, keyboard driver 2960, and display module 2965 are part of the operating system 2950 even when the media-editing application is a stand-alone application separate from the operating system.

The UI interaction module 2905 generates user interface items, such as the various color correction tools described above with respect to FIG. 24, and determines how they should be displayed within the media-editing application. The UI interaction module 2905 passes this information to display module 2965, which enables the display of the media-editing application, including the user interface items, on a computer monitor or other such display device (not shown).

A user interacts with the user interface via input devices (not shown). The input devices, such as cursor controllers (mouse, tablet, touchpad, etc.) and keyboards, send signals to the cursor controller driver 2955 and keyboard driver 2960, which translate those signals into user input data that is provided to the UI interaction module 2905. The UI interaction module 2905 uses the user input data to modify the displayed user interface items. For example, if a user drags a cursor over an image to be edited while in a boundary drawing mode, the UI interaction module will instruct the display module to draw a boundary over the image. The UI interaction module also passes data on user interactions to the boundary drawing module (for intereactions involving drawing a boundary) and the editing module (for interactions with the various editing tools provided).

Boundary drawing module 2910 translates the cursor movements passed by the UI interaction module 2905 into a boundary that is stored for a particular image. This boundary data is stored in storage 2935. The boundary drawing module 2910 uses the boundary extender 2915 to automatically extend the boundary to an intersection point (with the boundary itself or the border of an image) if necessary to fully divide the image into two separate regions. The boundary drawing module 2910 also uses the boundary modifier 2970 to process modifications to the boundary after it is initially drawn and extended. Data from the extension and modifications of a boundary is also passed to the boundary data storage 2935, as well as back to the UI interaction module 2905 for display over the image.

The alpha generator 2920 receives boundary data (either from the boundary drawing module 2910 or the boundary data storage 2935) and generates alpha values for the pixels of an image. The alpha values are stored in alpha information storage 2940. The alpha generator 2920 also receives information from the UI interaction module 2905, such as when a user selects a user interface item that toggles the region of interest (and thus the alpha values). In some embodiments, the alpha generator passes information to the UI interaction module 2905, which instructs display module 2965 to display an indication of the region of interest over the image.

The editing module 2925 performs the actual editing of the media content (i.e., videos, images, etc.), which is stored in storage 2945. The editing module receives alpha information from alpha generator 2920 and/or storage 2940 so it can apply edits to the appropriate pixels of the content received from storage 2945. The editing module 2925 also receives information from the UI interaction module 2905, such as input affecting color correction tools and other editing tools. After editing the content, the editing module 2925 stores the edited content in content storage 2945.

Preview generator 2930 enables the output of audio and video from the media-editing application application. The preview generator 2930, based on information from the editing module 2925 (and, in some embodiments, other modules), sends information about how to display each pixel of a video or image to the display module 2965.

While many of the features have been described as being performed by one module (e.g., the boundary drawing module 2910 or alpha generator 2920), one of ordinary skill would recognize that the functions might be split up into multiple modules, and the performance of one feature might even require multiple modules.

Figure 30:
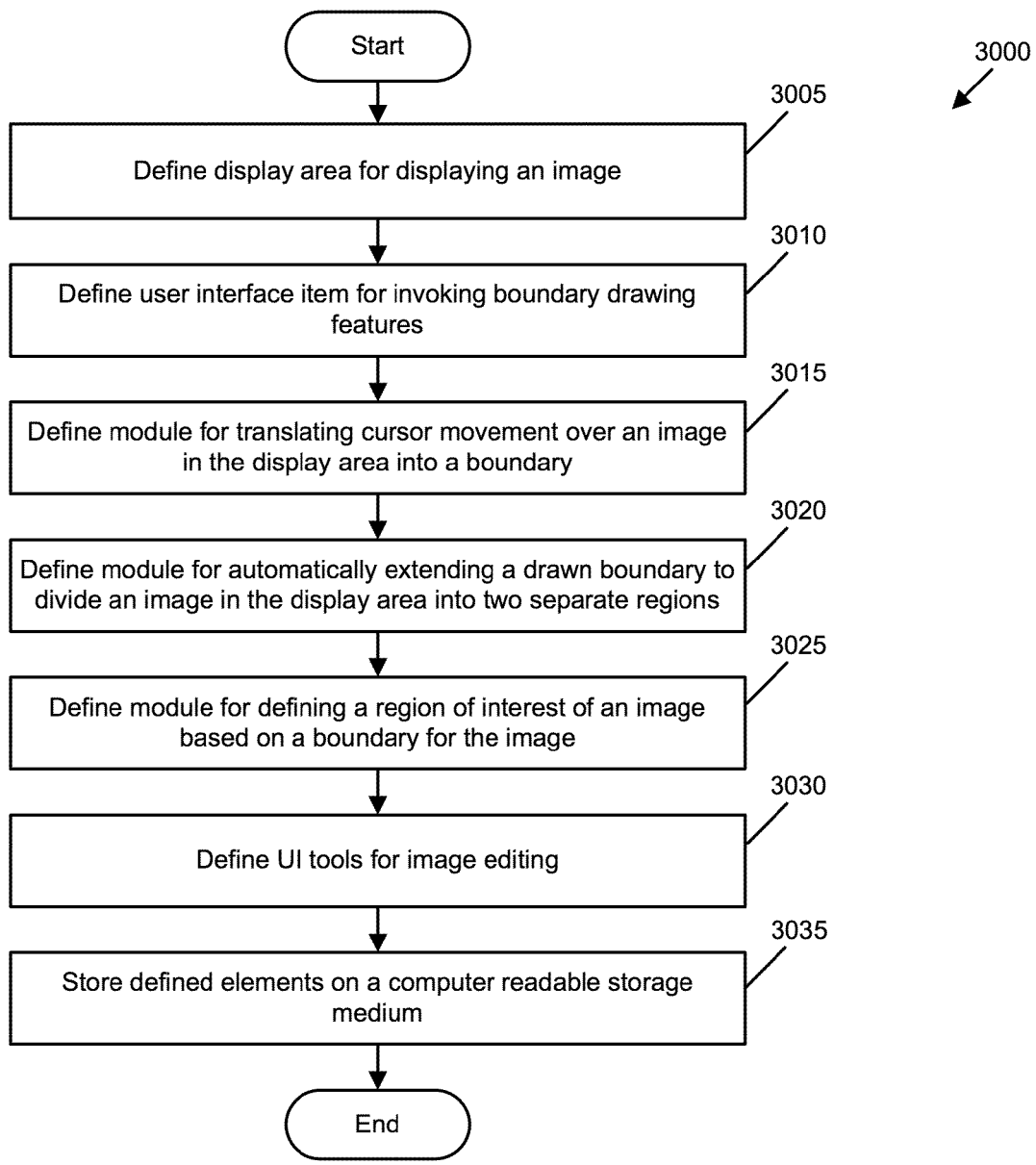
FIG. 30 conceptually illustrates a process of some embodiments for manufacturing a computer readable medium that stores a computer program.

FIG. 30 conceptually illustrates a process 3000 of some embodiments for manufacturing a computer readable medium that stores a computer program. In some embodiments, the computer readable medium is a distributable CD-ROM. As shown, process 3000 begins by defining (at 3005) a display area for displaying an image, such as display area 2405 of FIG. 24.

Process 3000 then defines (at 3010) a user interface item for invoking boundary drawing features. In some embodiments, this UI item is incorporated into the defined display area, in that the boundary drawing features are automatically invoked. In other embodiments, a user-selectable UI item that invokes boundary drawing features is defined. Next, the process defines (at 3015) a module for translating cursor movement over an image in the display area into a boundary. Border drawing module 2910 is an example of such a module. The process also defines (at 3020) a module for automatically extending a drawn boundary to divide an image in the display area into two separate regions. One example of such a module is border extender 2915.

Process 3000 then defines (at 3025) a module for defining a region of interest of an image based on a boundary for the image. Alpha generator 2920 is an example of such a module, though the region of interest could also be defined in terms other than the alpha channel in some embodiments. Next, the process defines (at 3030) one or more UI tools for editing an image. Color correction tools 2415 and 2420 of video-editing application 2400 are examples of such items, although many other items may be defined as well.

The process next stores (at 3035) the defined elements (i.e., the defined modules, UI items, etc.) on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium. One of ordinary skill in the art will recognize that the various modules and UI items defined by process 3000 are not exhaustive of the modules and UI items that could be defined and stored on a computer readable storage medium for an editing application incorporating some embodiments of the invention.

V. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

FIG. 18 illustrates a computer system with which some embodiments of the invention are implemented. Such a computer system includes various types of computer readable media and interfaces for various other types of computer readable media. Computer system 1800 includes a bus 1805, a processor 1810, a graphics processing unit (GPU) 1820, a system memory 1825, a read-only memory 3130, a permanent storage device 3135, input devices 3140, and output devices 3145.

The bus 3105 collectively represents all system, peripheral, and chipset buses that communicatively connect the numerous internal devices of the computer system 3100. For instance, the bus 3105 communicatively connects the processor 3110 with the read-only memory 3130, the GPU 3120, the system memory 3125, and the permanent storage device 3135.

From these various memory units, the processor 3110 retrieves instructions to execute and data to process in order to execute the processes of the invention. In some embodiments, the processor comprises a Field Programmable Gate Array (FPGA), an ASIC, or various other electronic components for executing instructions. In some embodiments, the processor Some instructions are passed to and executed by the GPU 3120. The GPU 3120 can offload various computations or complement the image processing provided by the processor 3110. In some embodiments, such functionality can be provided using CoreImage's kernel shading language.

The read-only-memory (ROM) 3130 stores static data and instructions that are needed by the processor 3110 and other modules of the computer system. The permanent storage device 3135, on the other hand, is a read-and-write memory device. This device is a non-volatile memory unit that stores instructions and data even when the computer system 3100 is off. Some embodiments of the invention use a mass-storage device (such as a magnetic or optical disk and its corresponding disk drive) as the permanent storage device 3135.

Other embodiments use a removable storage device (such as a floppy disk, flash drive, or ZIP® disk, and its corresponding disk drive) as the permanent storage device. Like the permanent storage device 3135, the system memory 3125 is a read-and-write memory device. However, unlike storage device 3135, the system memory is a volatile read-and-write memory, such a random access memory. The system memory stores some of the instructions and data that the processor needs at runtime. In some embodiments, the invention's processes are stored in the system memory 3125, the permanent storage device 3135, and/or the read-only memory 3130. For example, the various memory units include instructions for processing multimedia items in accordance with some embodiments. From these various memory units, the processor 3110 retrieves instructions to execute and data to process in order to execute the processes of some embodiments.

The bus 3105 also connects to the input and output devices 3140 and 3145. The input devices enable the user to communicate information and select commands to the computer system. The input devices 3140 include alphanumeric keyboards and pointing devices (also called "cursor control devices"). The output devices 3145 display images generated by the computer system. For instance, these devices display a GUI. The output devices include printers and display devices, such as cathode ray tubes (CRT) or liquid crystal displays (LCD).

Figure 31:
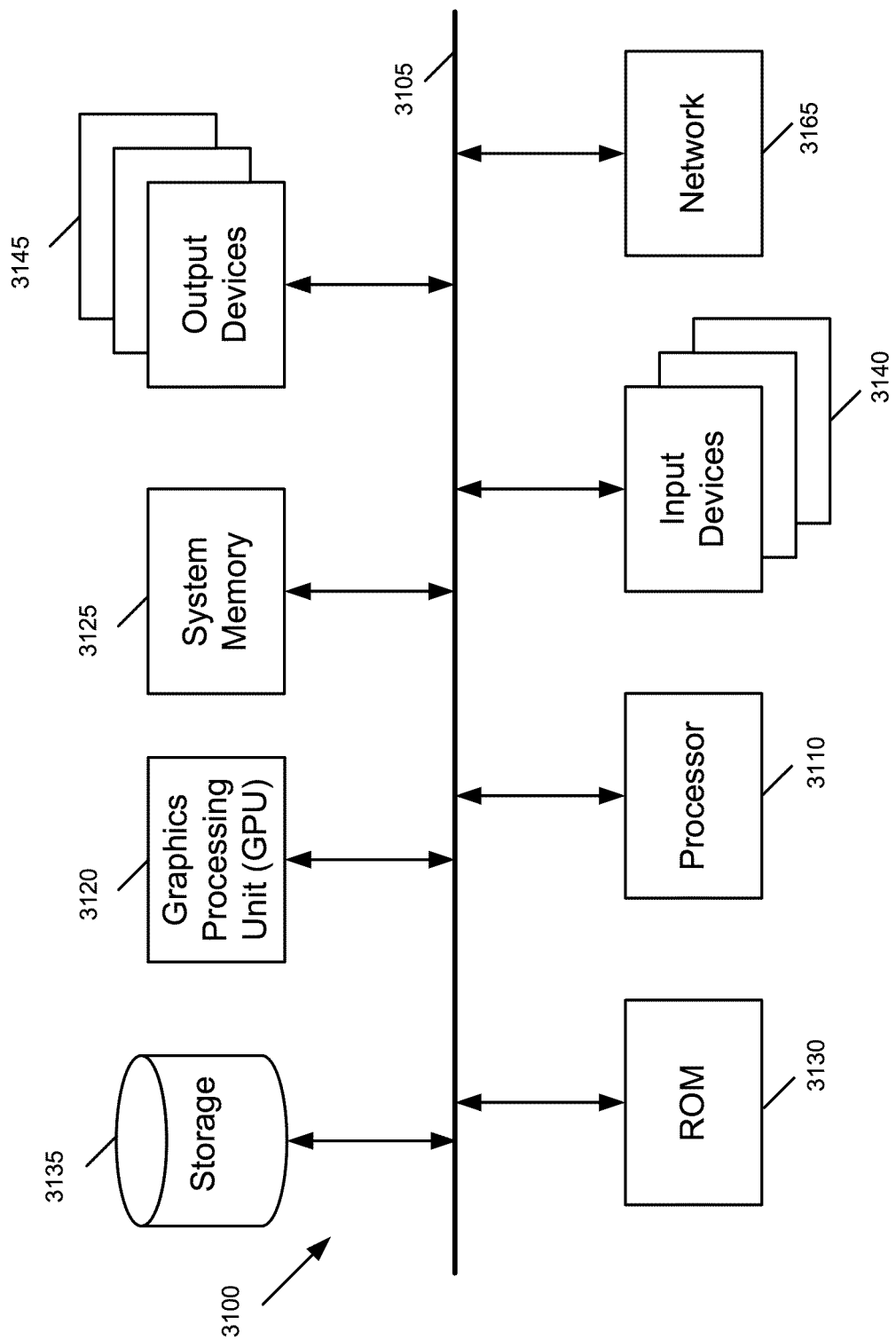
FIG. 31 illustrates a computer system with which some embodiments of the invention are implemented.

Finally, as shown in FIG. 31, bus 3105 also couples computer 3100 to a network 3165 through a network adapter (not shown). In this manner, the computer can be a part of a network of computers (such as a local area network ("LAN"), a wide area network ("WAN"), or an Intranet, or a network of networks, such as the internet. For example, the computer 3100 may be coupled to a web server (network 3165) so that a web browser executing on the computer 3100 can interact with the web server as a user interacts with a GUI that operates in the web browser.

Any or all components of computer system 3100 may be used in conjunction with the invention. For instance, in some embodiments the execution of the frames of the rendering is performed by the GPU 3120 instead of the CPU 3110. Similarly, other image editing functions can be offloaded to the GPU 3120 where they are executed before the results are passed back into memory or the processor 3110. However, a common limitation of the GPU 3120 is the number of instructions that the GPU 3120 is able to store and process at any given time. Therefore, some embodiments adapt instructions for implementing processes so that these processes fit onto the instruction buffer of the GPU 3120 for execution locally on the GPU 3120. Additionally, some GPUs 3120 do not contain sufficient processing resources to execute the processes of some embodiments and therefore the CPU 3110 executes the instructions. One of ordinary skill in the art would appreciate that any other system configuration may also be used in conjunction with the present invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A non-transitory machine readable medium storing a program which when executed by at least one processing unit edits an image, the program comprising sets of instructions for:
    drawing, for a displayed image, a partial boundary based on a movement of a location indicator over the image, the partial boundary not fully dividing the image into two distinct regions;
    upon completion of the location indicator movement, automatically extending at least one end of the boundary, at tangents to the ends of the drawn partial boundary, in order to divide the image into the two distinct regions comprising a region of interest and a second region;
    receiving an image-editing operation to apply to the image; and
    applying the image-editing operation to only the region of interest of the image.

2. The non-transitory machine readable medium of claim 1, wherein the image comprises a plurality of pixels, wherein each particular pixel is assigned an alpha value that indicates whether an edit is applied to the particular pixel.

3. The non-transitory machine readable medium of claim 2, wherein pixels in the region of interest are assigned an alpha value of 1.

4. The non-transitory machine readable medium of claim 2, wherein pixels in the second region are assigned an alpha value of 0.

5. The non-transitory machine readable medium of claim 1, wherein the sets of instructions are performed by a video-editing application.

6. A non-transitory machine readable medium storing a program which when executed by at least one processing unit edits an image, the program comprising sets of instructions for:
    drawing, for a displayed image, a partial boundary based on a movement of a location indicator over the image, the partial boundary not fully dividing the image into two distinct regions;
    upon completion of the location indicator movement, automatically extending both ends of the boundary, at tangents to the ends of the drawn partial boundary, to points at which the boundary ends intersect within the image in order to divide the image into the two distinct regions comprising a region of interest and a second region;
    receiving an image-editing operation to apply to the image; and
    applying the image-editing operation to only the region of interest of the image.

7. The non-transitory machine readable medium of claim 6, wherein the program further comprises a set of instructions for defining a mask for the image based on the boundary before applying edits to the region of interest.

8. The non-transitory machine readable medium of claim 7, wherein the region of interest is non-transparent in the mask and the second region is transparent.

9. The non-transitory machine readable medium of claim 6, wherein the sets of instructions are performed by an image-editing application.

10. A non-transitory machine readable medium storing a program which when executed by at least one processing unit edits an image, the program comprising sets of instructions for:
    drawing, for a displayed image, a partial boundary based on a movement of a location indicator over the image, the partial boundary not fully dividing the image into two distinct regions;
    upon completion of the location indicator movement, (i) automatically extending both ends of the partial boundary, at tangents to the ends of the drawn partial boundary, to points at which the ends of the partial boundary intersect borders of the image and (ii) connecting the partial boundary from the intersection points along the borders of the image in order to divide the image into the two distinct regions comprising a region of interest and a second region;
    receiving an image-editing operation to apply to the image; and
    applying the image-editing operation to only the region of interest of the image.

11. The non-transitory machine readable medium of claim 10, wherein the program further comprises sets of instructions for:
    receiving modifications to the partial boundary; and modifying the region of interest in response to the received modifications.

12. The non-transitory machine readable medium of claim 10, wherein the image is a digital video picture.

13. The non-transitory machine readable medium of claim 12, wherein the digital video picture is one of a sequence of digital video pictures, wherein the edits applied to the digital video picture are applied to all digital video pictures in the sequence.

14. A non-transitory machine readable medium storing a program which when executed by at least one processing unit edits an image, the program comprising sets of instructions for:
receiving a boundary based on a movement of a location indicator for a displayed image that does not fully separate the image into two mutually exclusive portions for editing;
automatically modifying the received boundary in order to fully separate the image into a first portion and a second portion by extending the received boundary at tangents to ends of the received boundary, upon completion of the location indicator movement, wherein the first and second portions (i) comprise mutually exclusive sets of pixels of the image, wherein the pixels of the first portion are each assigned a value different from a value assigned to the pixels of the second portion indicating that the first portion is a region of interest and (ii) combine to make up the entire image;
receiving an image-editing operation to apply the image; and
applying the received image-editing operation to only the region of interest.

15. The non-transitory machine readable medium of claim 14, wherein the modified boundary fully encloses one of the first and second portions, wherein the received edits are only applied to the enclosed portion.

16. A method comprising:
providing a display area for displaying an image;
providing a boundary drawing tool for:
(i) translating movement of a location indicator over the displayed image into a boundary drawn along the movement of the location indicator, wherein the boundary does not fully divide the image into two separate regions; and
(ii) upon completion of the location indicator movement, automatically extending both ends of the boundary, at tangents to the ends of the boundary, to points at which the ends of the boundary intersect borders of the image and connecting the boundary from the intersection points along the borders of the image in order to divide the image into a region of interest and a second region; and
providing a set of image editing tools for applying edits to only the region of interest of the image.

17. The method of claim 16, wherein the image editing tools comprise color correction tools.

18. The method of claim 16, wherein the display area is for displaying a digital video picture from a video clip.

19. The method of claim 18, wherein the video clip comprises a plurality of digital video pictures, the method further comprising providing a tool for automatically modifying the boundary for each of the digital video pictures in the video clip such that edits applied only to the region of interest of the displayed video picture are applied to a corresponding region of interest in each of the other video pictures.

20. A non-transitory machine readable storage medium storing a program for execution by at least one processing unit, the program comprising a graphical user interface (GUI), the GUI comprising:
a display area for displaying an image and receiving a partial boundary based on a movement of a location indicator over the displayed image, wherein the partial boundary does not fully separate the image into two mutually exclusive portions for editing;
a boundary drawing tool for (i) translating the received user input over the displayed image and (ii) upon completion of the location indicator movement over the displayed image, automatically extending the at least one end of the partial boundary, at tangents to the ends of the received boundary, in order to fully separate the image into a first portion and a second portion, wherein the first and second portions (i) are mutually exclusive and (ii) combine to make up the entire image; and
a set of media-editing tools for editing only one of the two portions of the image.

* * * * *